United States Patent
Shafin et al.

(10) Patent No.: US 11,871,353 B2
(45) Date of Patent: Jan. 9, 2024

(54) RESTRICTED TWT OPERATIONS FOR MULTI-LINK DEVICES

(71) Applicant: Samsung Electronics Co., Ltd., Suwon-si (KR)

(72) Inventors: Rubayet Shafin, Allen, TX (US); Boon Loong Ng, Plano, TX (US); Peshal Nayak, Plano, TX (US); Ahmed Atef Ibrahim Ibrahim, Plano, TX (US); Vishnu Vardhan Ratnam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/655,765

(22) Filed: Mar. 21, 2022

(65) Prior Publication Data

US 2022/0303907 A1 Sep. 22, 2022

Related U.S. Application Data

(60) Provisional application No. 63/319,181, filed on Mar. 11, 2022, provisional application No. 63/305,532, (Continued)

(51) Int. Cl.
*H04W 52/02* (2009.01)
*H04W 76/15* (2018.01)

(52) U.S. Cl.
CPC ....... *H04W 52/0258* (2013.01); *H04W 76/15* (2018.02)

(58) Field of Classification Search
CPC .......................... H04W 52/0258; H04W 76/15
(Continued)

(56) References Cited

U.S. PATENT DOCUMENTS

2021/0144637 A1* 5/2021 Kwon ............... H04W 52/0216
2022/0279601 A1* 9/2022 Xue .................. H04W 74/0816

FOREIGN PATENT DOCUMENTS

WO 2021003181 A1 1/2021

OTHER PUBLICATIONS

IEEE P802.11be-D0.4 "Part 11: Wireless LAN Medium Access Control (MAC) and Physical Layer (PHY) Specifications—Amendment 8: Enhancements for extremely high throughput (EHT)" Mar. 2021, 511 pgs.

(Continued)

*Primary Examiner* — Gbemileke J Onamuti

(57) ABSTRACT

Embodiments of the present disclosure provide methods and apparatuses for facilitating restricted target wake time (TWT) operation in a wireless local area network. The apparatuses include a non-access point (AP) multi-link device (MLD) comprising a plurality of stations (STAs) and a processor. Each STA comprises a transceiver configured for broadcast TWT operation on multi-link operation (MLO) links with corresponding APs of an AP MLD. The processor is operably coupled to the transceivers, and configured to negotiate a broadcast TWT schedule over a first link between a first STA and a first AP of the AP MLD, apply the broadcast TWT schedule to the group of links, negotiate a restricted TWT schedule with the AP MLD over at least one link of the group of links, and establish the restricted TWT schedule on one or more links of the at least one link.

20 Claims, 32 Drawing Sheets

Related U.S. Application Data filed on Feb. 1, 2022, provisional application No. 63/245,595, filed on Sep. 17, 2021, provisional application No. 63/191,602, filed on May 21, 2021, provisional application No. 63/179,032, filed on Apr. 23, 2021, provisional application No. 63/164,322, filed on Mar. 22, 2021.

(58) Field of Classification Search
USPC .......................................................... 370/311
See application file for complete search history.

(56) References Cited

OTHER PUBLICATIONS

IEEE 802.11-21/462, "Wireless LANs Restricted TWT Spec Text-Resolving TBDs: Part I", Mar. 2021, 7 pgs.
IEEE 802.11-19/1988-03-00be, "Power Save for Multi-link", Nov. 2019, 15 pgs.
International Search Report and Written Opinion dated Jun. 14, 2022 regarding International Application No. PCT/KR2022/003968, 6 pages.
Samsung Research America, 'MLO: Broadcast TWT for MLDs', IEEE802.11-21/0394r0, Mar. 7, 2021, 10 pages.
Canon, 'Low-Latency Triggered TWT', IEEE802.11-20/1843r2, Dec. 17, 2020, 14 pages.
Huawei, 'TWT for MLD', IEEE802.11-21/0080r6, Mar. 17, 2021, 6 pages.
Apple Inc. et al., 'Group Addressed Data Frame Delivery Methods for MLO', IEEE802.11-21/0041r1, Feb. 18, 2021, 19 pages.

* cited by examiner

| 1502 | | | | | |
|---|---|---|---|---|---|
| Request Type | Target Wake Time | Nominal Minimum TWT Wake Duration | TWT Wake Interval Mantissa | Broadcast TWT Info | Broadcast TWT Link ID Bitmap |

Octets: 2 | 2 | 1 | 2 | 2 | 0 or 2

FIG. 15

| 1602 | | | | | | | |
|---|---|---|---|---|---|---|---|
| B0 | B1 B2 B3 | B4 | B5 | B6 B7 | B8 B9 B10 | B10 B11 B12 B13 B14 | B15 |
| TWT Request | TWT Setup Command | Trigger | Last Broadcast Parameter Set | Flow Type | Broadcast TWT Recommendation | TWT Wake Interval Exponent | Broadcast TWT Link ID Bitmap Present |

Bits: 1 | 3 | 1 | 1 | 1 | 3 | 5 | 1

FIG. 16

| B0 | B1 | B2 | B3 | B7 | B8 | B15 |
|---|---|---|---|---|---|---|
| Reserved | Restricted TWT Schedule | bTWT Link ID Bitmap Present | Broadcast TWT ID | | Broadcast TWT Persistence | |
| 1 | 1 | 1 | 5 | | 8 | |

Bits:

| Request Type | Target Wake Time | Nominal Minimum TWT Wake Duration | TWT Wake Interval Mantissa | Broadcast TWT Info | Broadcast TWT Link ID Bitmap | Broadcast TWT Traffic Info |
|---|---|---|---|---|---|---|
| 2 | 2 | 1 | 2 | 2 | variable | variable |

Octets:

| NDP Paging Indicator | Responder PM Mode | Negotiation Type | TWT Information Frame Disabled | Wake Duration Unit | MLO Enabled (2302) | Reserved |
|---|---|---|---|---|---|---|
| 1 | 1 | 2 | 1 | 1 | 1 | 1 |

Bits:

FIG. 24

| NDP Paging Indicator | Responder PM Mode | Negotiation Type | TWT Information Frame Disabled | Wake Duration Unit | Individual TWT MLO Enabled (2402) | Broadcast TWT MLO Enabled (2404) |
|---|---|---|---|---|---|---|
| 1 | 1 | 2 | 1 | 1 | 1 | 1 |

Bits:

| Request Type | Target Wake Time | Nominal Minimum TWT Wake Duration | TWT Wake Interval Mantissa | Broadcast TWT Info | Restricted TWT Traffic Info (optional) | Link ID Bitmap |
|---|---|---|---|---|---|---|
| 2 | 2 | 1 | 2 | 2 | 0 or 3 | 0 or 2 |

Octets

| TWT Request | TWT Setup Command | Trigger | Last Broadcast Parameter Set | Flow Type | Broadcast TWT Recommendation | TWT Wake Interval Exponent | Reserved Broadcast TWT Link ID Bitmap Present |
|---|---|---|---|---|---|---|---|
| B0 | B1　B2　B3 | B4 | B5 | B6 | B7　B8　B9 | B10　　　B14 | B15 |
| 1 | 3 | 1 | 1 | 1 | 3 | 5 | 1 |

Bits

RESTRICTED TWT OPERATIONS FOR MULTI-LINK DEVICES

CROSS-REFERENCE TO RELATED APPLICATION(S) AND CLAIM OF PRIORITY

This application claims priority under 35 U.S.C. § 119(e) to U.S. Provisional Patent Application No. 63/164,322 filed on Mar. 22, 2021, U.S. Provisional Patent Application No. 63/191,602 filed on May 21, 2021, U.S. Provisional Patent Application No. 63/305,532 filed on Feb. 1, 2022, U.S. Provisional Patent Application No. 63/179,032 filed on Apr. 23, 2021, U.S. Provisional Patent Application No. 63/245,595 filed on Sep. 17, 2021, and U.S. Provisional Patent Application No. 63/319,181 filed Mar. 11, 2022, which are hereby incorporated by reference in their entirety.

TECHNICAL FIELD

This disclosure relates generally to power management in wireless communications systems. Embodiments of this disclosure relate to methods and apparatuses for facilitating restricted target wake time operation among stations affiliated with a multi-link device for communications in a wireless local area network communications system.

BACKGROUND

With the standardization process of the next generation IEEE 802.11 wireless local area network (WLAN), i.e., IEEE 802.11ax amendment entering the final stage, the IEEE 802.11ax amendment is drawing attention of the information technology (IT) industry. It newly introduces features for improving peak throughput and efficiency in an environment crowded by many 802.11 devices. Example environments include airports, stadiums, and so on. Wi-Fi alliance (WFA) has already launched the WI-FI 6 certification program for guaranteeing interoperability between certified products implementing IEEE 802.11ax amendment. In the market, device manufacturers are already starting to release WI-FI 6 certified smart mobile devices.

Target Wake Time (TWT) is one of the important features of the IEEE 802.11ax amendment. TWT enables wake time negotiation between an access point (AP) and an associated station (STA) for improving power efficiency. With TWT operation, it suffices for a STA to only wake up at pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT (bTWT) operation, an AP can set up a shared TWT session for a group of STAs.

The negotiated parameters such as the wake interval, wake duration and initial wake time (offset) highly affect latency, throughput as well as power efficiency, which are directly related to QoS (quality of service) or customer experiences. Services with different traffic characteristics will have different TWT parameter configurations for better QoS. Additionally, the TWT configuration should adapt to network and service status variation.

TWT allows the non-AP STAs to wake up at designated time only, and thereby reduce power consumption. Some applications (e.g., cloud gaming, AR glasses) can have periodic burst traffic with very strict latency requirements. In setting up TWT by a non-AP STA, the STA may not have the traffic delay information at the AP (i.e., arrival time of downlink traffic). It may lead to large delay between the DL traffic arrival time and TWT service period (SP) start time. This may severely affect latency-sensitive applications. If the non-AP STA has information on the traffic delay at the AP, it can accordingly adjust its TWT parameters and hence can better support TWT traffic.

Multi-link operation (MLO) is another key feature that is currently being developed by the standards body for next generation extremely high throughput (EHT) WI-FI systems, IEEE 802.11be. The WI-FI devices that support MLO are referred to as multi-link devices (MLDs). With MLO, it is possible for a non-AP MLD to discover, authenticate, associate, and set up multiple links with an AP MLD. Channel access and frame exchange is possible on each link that is set up between the AP MLD and non-AP MLD.

MLO has two variations. The first type is simultaneous transmit/receive (STR) where the STAs affiliated with an MLD can transmit and receive independent of each other. The second variation is non-simultaneous transmit/receive (NSTR) in which the links formed by the STAs affiliated with an MLD do not form an STR link pair. If a link pair constitutes an NSTR link pair, transmission on one link can cause interference to the other link due to signal leakiness which the device's radio transceiver is unable to withstand. Consequently, two STAs forming an NSTR link pair cannot simultaneously transmit and receive frames. Since the STR mode of operation requires two or more radios with sufficient isolation, it is expected that AP MLDs will have STR capabilities while non-AP MLDs are more likely not to be capable of STR, and thus use NSTR.

Restricted TWT (rTWT) operation is another key feature introduced in IEEE 802.11be standards with a view to providing better support for latency sensitive applications. Restricted TWT is based on broadcast TWT operation and offers a protected service period for its member STAs by sending Quiet elements to other STAs in the basic service set (BSS) which are not members of the restricted TWT schedule, where the Quiet interval corresponding to the Quiet element overlaps with the initial portion of the restricted TWT SP. Hence, it gives more channel access opportunity for the restricted TWT member scheduled STAs, which definitely helps latency-sensitive traffic flow.

SUMMARY

Embodiments of the present disclosure provide methods and apparatuses for facilitating restricted TWT operation among MLDs in a wireless local area network.

In one embodiment, a non-AP MLD is provided, comprising a plurality of stations (STAs) and a processor. Each STA comprises a transceiver configured to transmit and receive signals in target wake time (TWT) operation on multi-link operation (MLO) links between the STAs and corresponding APs of an AP MLD, respectively. The processor is operably coupled to the transceivers, and configured to negotiate a broadcast TWT schedule over a first link between a first STA and a first AP of the AP MLD, wherein the broadcast TWT schedule is for a shared TWT session including a group of the links, after the broadcast TWT schedule is successfully negotiated, apply the broadcast TWT schedule to the group of links, negotiate a restricted TWT schedule with the AP MLD over at least one link of the group of links, and after the restricted TWT schedule is successfully negotiated, establish the restricted TWT schedule on one or more links of the at least one link, such that the one or more links are members of the restricted TWT schedule.

In another embodiment, an AP MLD is provided, comprising a plurality of APs and a processor. The APs each comprise a transceiver configured to transmit and receive signals in target wake time (TWT) operation on multi-link operation (MLO) links between the APs and corresponding stations (STAs) of a non-AP MLD, respectively. The processor is coupled to the transceivers, and is configured to negotiate a broadcast TWT schedule over a first link between a first AP and a first STA of the non-AP MLD, wherein the broadcast TWT schedule is for a shared TWT session including a group of the links, after the broadcast TWT schedule is successfully negotiated, apply the broadcast TWT schedule to the group of links, negotiate a restricted TWT schedule with the non-AP MLD over at least one link of the group of links, and after the restricted TWT schedule is successfully negotiated, establish the restricted TWT schedule on one or more links of the at least one link, such that the one or more links are members of the restricted TWT schedule.

In another embodiment, a method performed by a non-AP MLD is provided, including the steps of negotiating a broadcast TWT schedule over a first link between a first STA and a first AP of the AP MLD, wherein the broadcast TWT schedule is for a shared TWT session including a group of the links, after the broadcast TWT schedule is successfully negotiated, applying the broadcast TWT schedule to the group of links, negotiating a restricted TWT schedule with the AP MLD over at least one link of the group of links, and after the restricted TWT schedule is successfully negotiated, establishing the restricted TWT schedule on one or more links of the at least one link, such that the one or more links are members of the restricted TWT schedule.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] IEEE P802.11be—D0.4 "Part 11: Wireless LAN Medium Access Control (MAC) and Physical Layer (PHY) Specifications—Amendment 8: Enhancements for extremely high throughput (EHT)".

[2] IEEE 802.11be/D0.4, "Wireless LAN Medium Access Control (MAC) and Physical Layer (PHY) Specifications", March 2021.

[3] IEEE 802.11-19/1988r3, "Power Save for Multi-link", June 2020.

[4] IEEE 802.11-21/0462r9, "Restricted TWT Spec Text—Resolving TBDs: Part I", May 2021.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 15 illustrates an example of a Broadcast TWT Parameter Set including a Broadcast TWT Link ID Bitmap field according to embodiments of the present disclosure;

FIG. 16 illustrates an example of a Request Type field format of a Broadcast TWT Parameter Set according to embodiments of the present disclosure;

FIG. 17 illustrates an example of a Broadcast TWT Info subfield format of a Broadcast TWT Parameter Set according to embodiments of the present disclosure;

FIG. 18 illustrates an example of a Broadcast TWT Parameter Set that includes a Broadcast TWT Traffic Info field according to embodiments of the present disclosure;

FIG. 23 illustrates an example Control field format of a TWT element according to various embodiments of the present disclosure;

FIG. 24 illustrates an example Control field format of a TWT element with separate Individual and Broadcast TWT Enabled bits according to various embodiments of the present disclosure;

FIG. 41 illustrates an example format of a Broadcast TWT Parameter Set field in a TWT element according to one embodiment; and FIG. 42 illustrates an example format of a Request Type field in a Broadcast TWT Parameter Set field according to one embodiment.

DETAILED DESCRIPTION

Figure 1:
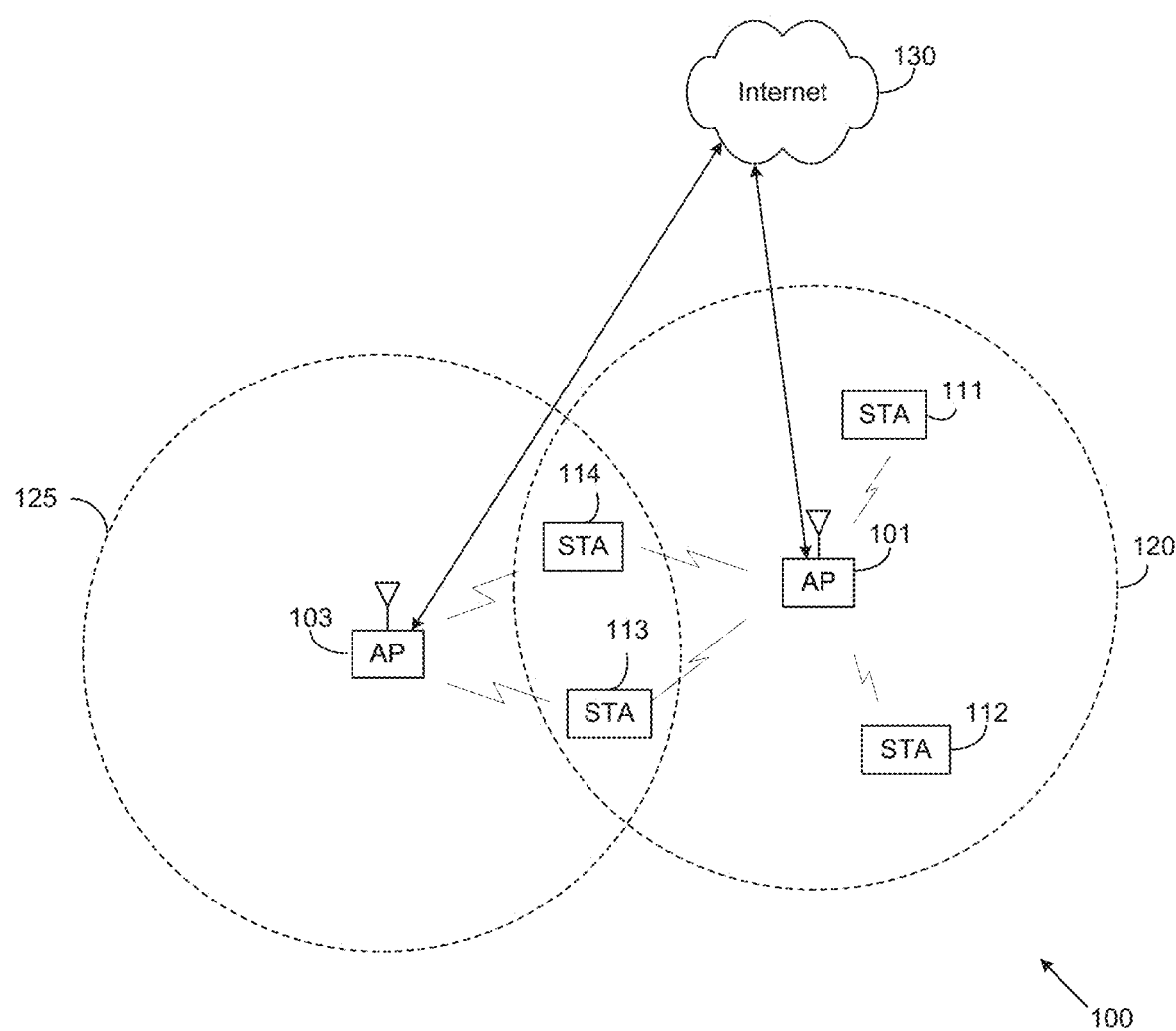
FIG. 1 illustrates an example wireless network according to various embodiments of the present disclosure.

FIGS. 1 through 42, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that a STA affiliated with an MLD may negotiate individual TWT agreements with another STA affiliated with another MLD, and in doing so, may indicate multiple links for negotiation. If multiple links are indicated in one TWT element, then multiple TWT agreements are requested with the same TWT parameters—one for each of the STAs that are operating on the indicated links. However, using individual TWT operation for MLO, it is possible for the negotiating link to set up TWT for multiple links with different TWT parameter sets. Multiple TWT elements need to be sent by the requesting STA affiliated with the MLD. Each TWT element has the corresponding TWT parameters for the respective link. In this case, since each TWT element can also indicate multiple links, it is possible that different TWT elements contain different TWT parameter sets for the same ML link. In such a scenario, there is a need to determine how to resolve potential TWT parameter conflicts for the same link.

Accordingly, embodiments of the present disclosure provide apparatuses and methods that support multi-link indication for TWT operation for WI-FI MLDs by resolving TWT parameter conflicts resulting from multi-link indication. In particular, embodiments of the present disclosure provide three options for resolving such conflicts. First, the responding STA may select one TWT parameter set from any of the TWT elements for a given link. Second, the responding STA may select all or a subset of the suggested TWT parameter sets for a given link. Third, the responding STA may treat the conflicting request or suggestion by the requesting STA as erroneous.

Embodiments of the present disclosure further recognize that restricted TWT operation in the context of MLDs is currently not well supported. In order to ensure efficient MLD operation, a framework for restricted TWT operation in the context of MLDs needs to established.

Furthermore, embodiments of the present disclosure recognize that broadcast TWT (upon which restricted TWT is based) is a special kind of TWT operation where multiple participating STAs can obtain membership to the same TWT schedule in a shared TWT session, and when setting up Broadcast TWT schedules between an AP MLD and a non-AP MLD, if the Broadcast TWT schedules are aligned across multiple links, then both the AP MLD and non-AP MLD may be benefitted. For example, the same traffic flow could be directed towards multiple links between the AP MLD and the non-AP MLD. For latency-sensitive traffic, this increases the channel access opportunities (and thus increases channel access probability) and reduces channel contention. For restricted TWT operation for MLDs, currently, there is no support available that enables a Restricted TWT schedule to be aligned across multiple links between an AP MLD and a non-AP MLD. Due to lack of this support, the overall performance of MLDs may deteriorate.

Accordingly, embodiments of the present disclosure provide apparatuses and methods that enable restricted TWT operation for MLDs. These embodiments provide a framework for supporting such operation and also describe how restricted TWT operation can be applied to an Aligned Schedule in broadcast TWT operation in MLDs.

Additionally, embodiments of the present disclosure recognize that data transmission rules for NSTR non-AP MLDs—for which STAs affiliated with the non-AP MLD form one or more NSTR link pairs—are defined in 802.11be standards. According to current specifications, for transmission of a physical layer protocol data unit (PPDU) on a link that forms an NSTR link pair with other STA(s) affiliated with the same non-AP MLD, the end time of the PPDUs transmitted on those links need to be aligned in order to prevent self-interference at the non-AP MLD side due to NSTR constraints. However, if a restricted TWT schedule is established on a link that is a part of an NSTR link pair, and if PPDUs transmitted during a restricted TWT service period (SP) need to be aligned (for example, through adding extra padding) with PPDUs transmitted on other links, then the traffic flow for the low-latency traffic transmitted during a restricted TWT SP can be severely interrupted. This can disrupt the corresponding latency-sensitive applications at the client side.

Accordingly, embodiments of the present disclosure provide apparatuses and methods for handling NSTR issues related restricted TWT operation on a link between an AP MLD and a non-AP MLD that forms one or more NSTR link pairs between the same AP MLD and the non-AP MLD.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating restricted TWT operation among MLDs in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
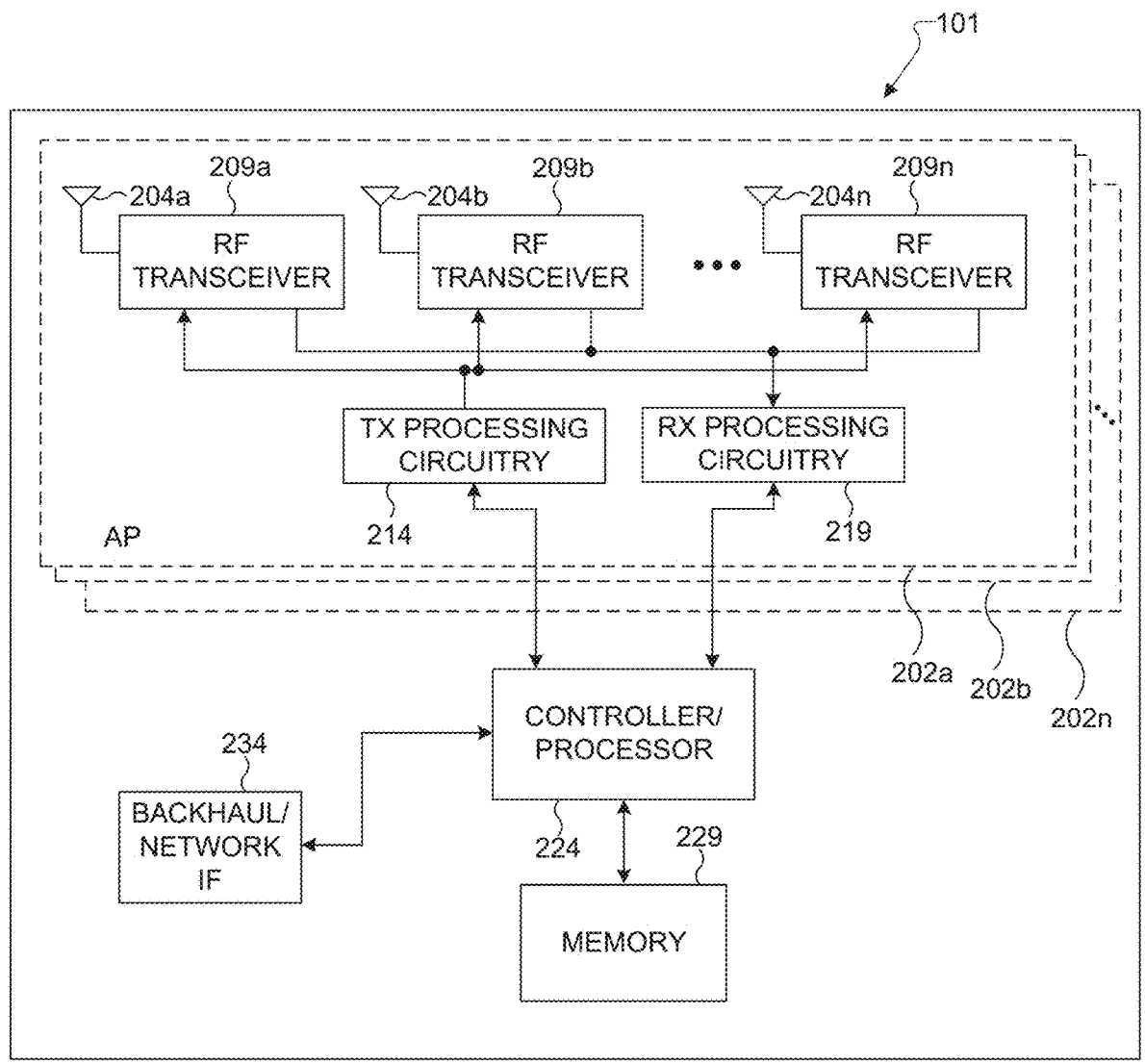
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating broadcast TWT operation among MLDs in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating restricted TWT operation among MLDs in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
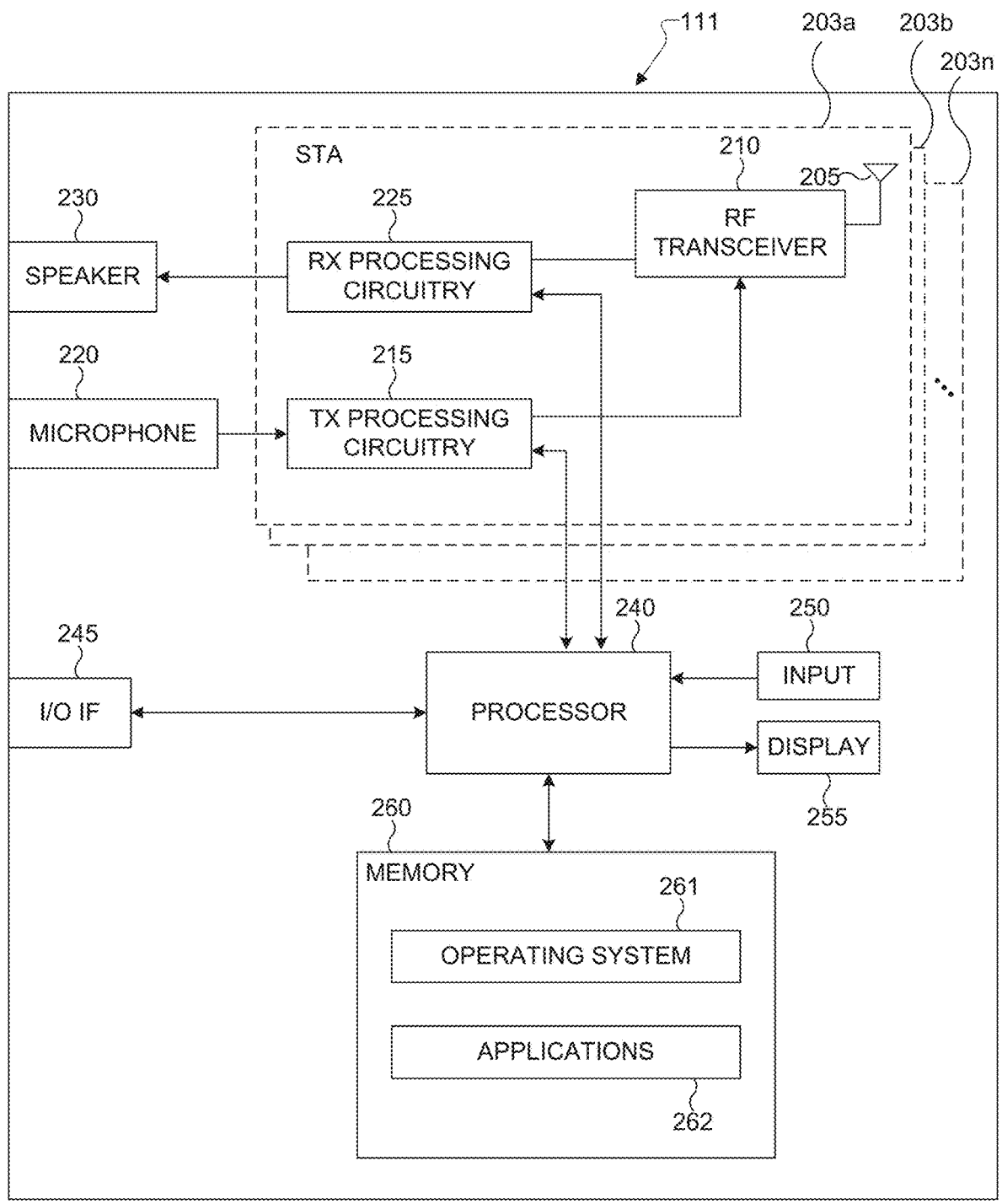
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide facilitating restricted TWT operation among MLDs in WLANs. In some embodiments, the controller/processor 240 includes at least one microprocessor or microcontroller.

The controller/processor 240 is also capable of executing other processes and programs resident in the memory 260, such as operations for facilitating restricted TWT operation among MLDs in WLANs. The controller/processor 240 can move data into or out of the memory 260 as required by an executing process. In some embodiments, the controller/processor 240 is configured to execute a plurality of applications 262, such as applications for facilitating restricted TWT operation among MLDs in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3A:
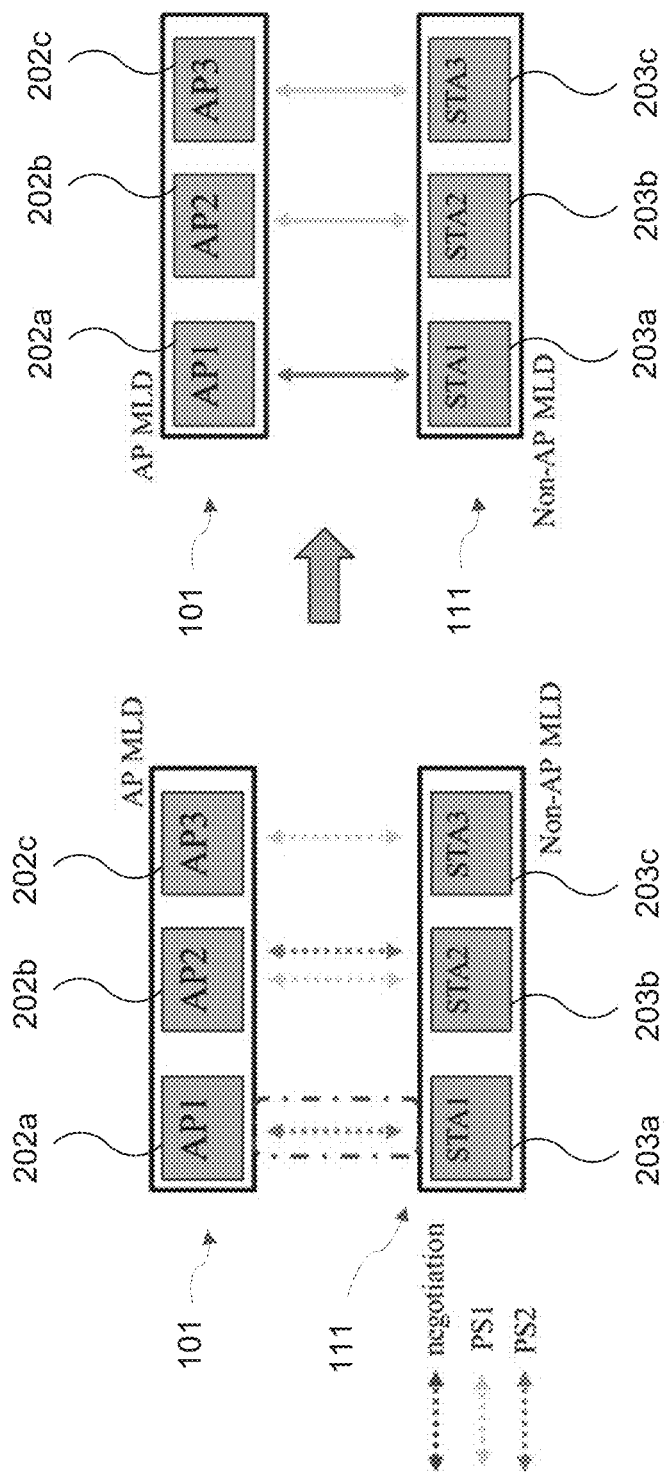
FIGS. 3A and 3B illustrate example processes of multi-link indication during individual TWT agreement setup for multiple links between an AP MLD and a non-AP MLD according to embodiments of the present disclosure.
Figure 3B:
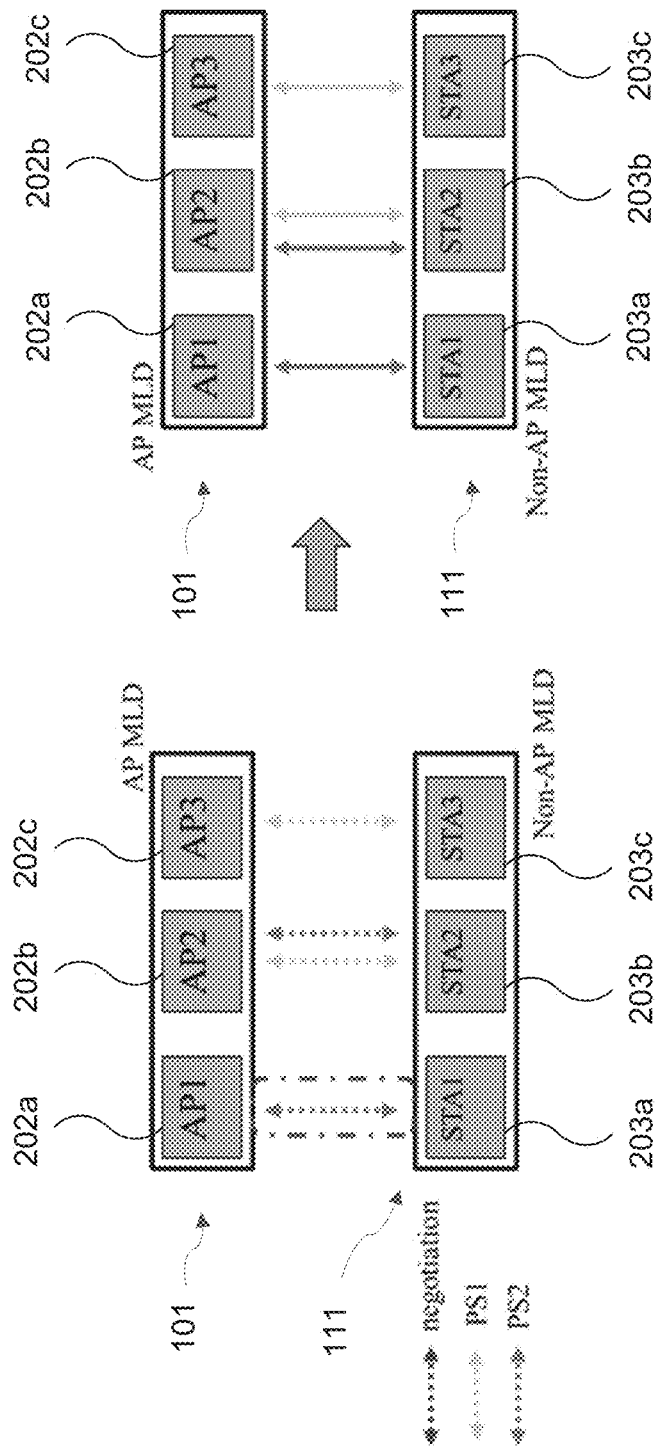

FIGS. 3A and 3B illustrate example processes of multi-link indication during individual TWT agreement setup for multiple links between an AP MLD 101 and a non-AP MLD 111 according to embodiments of the present disclosure. For ease of explanation, the AP MLD 101 is illustrated with three affiliated APs and the non-AP MLD 111 is illustrated with three affiliated STAs, but it is understood that this process could be applied with suitable MLDs having any number of affiliated APs or STAs.

In the embodiments of FIGS. 3A and 3B, an ML setup operation has been performed between the AP MLD 101 and non-AP MLD 111, and links have been set up between STA1 (STA 203a) and AP1 (AP 202a), referred to as link 1, STA2 (STA 203b) and AP2 (AP 202b), referred to as link 2, and STA3 (STA 203c) and AP3 (AP 202c), referred to as link 3. Each of these links may operate at a different bandwidth (e.g., 2.4 GHz, 5 GHz, and 6 GHz, respectively).

A STA affiliated with the non-AP MLD 111 may negotiate individual TWT agreements with an AP affiliated with the AP MLD 101 on one setup link (referred to as the negotiating link), and may do so for multiple links that are set up between the MLDs. The requesting STA affiliated with the non-AP MLD 111 can set up TWT agreements for multiple links with different TWT parameter sets by sending multiple TWT elements over the negotiating link. Each TWT element has includes TWT parameters corresponding to the link for which it is negotiating an individual TWT agreement.

In both of the examples of FIGS. 3A and 3B, STA1 affiliated with the non-AP MLD 111 negotiates multiple individual TWT agreements over link 1 (i.e., the negotiating link) with AP1. STA1 sends two TWT elements with different TWT parameter sets—PS1 and PS2—to AP1 over the negotiating link. The first TWT element indicates links 1 and link 2—that is, the TWT parameter set PS1 is suggested for link 1 and link 2. The second TWT element indicates link 2 and link 3—that is, the TWT parameter set PS2 is suggested for link 2 and link 3. As the two TWT elements suggest two different parameter sets for TWT operation for link 2, there is a potential conflict.

As discussed above, one option to resolve this conflict is to choose a single one of the TWT parameter sets suggested by the TWT elements that indicate link 2. In the example of FIG. 3A, the AP MLD 101 resolves the conflict by deciding to select PS2 for link 2. After successful TWT setup, link 1 assumes PS1, link 2 assumes PS2 and link 3 assumes PS2.

As also discussed above, another option to resolve this conflict is to select all or a subset of the suggested TWT parameter sets that indicate link 2. In the example of FIG. 3B, the AP MLD 101 resolves the conflict by deciding to select both PS1 and PS2 for link 2. After successful TWT setup, link 1 assumes PS1, link 2 assumes PS1 and PS2, and link 3 assumes PS2.

In some embodiments, the above procedure is applied when the conflicting TWT negotiations for a link are occurring in parallel. If a new TWT negotiation occurs for a link where there is already an existing TWT agreement, then the newly requested TWT agreement can be added on top of the existing TWT agreement. In one embodiment, the traffic associated with a TWT agreement can also be transmitted within the service period of another TWT agreement on the same link. In another embodiment, the traffic associated with a TWT agreement is limited to transmission within the service period of the corresponding TWT agreement only.

Figure 4:
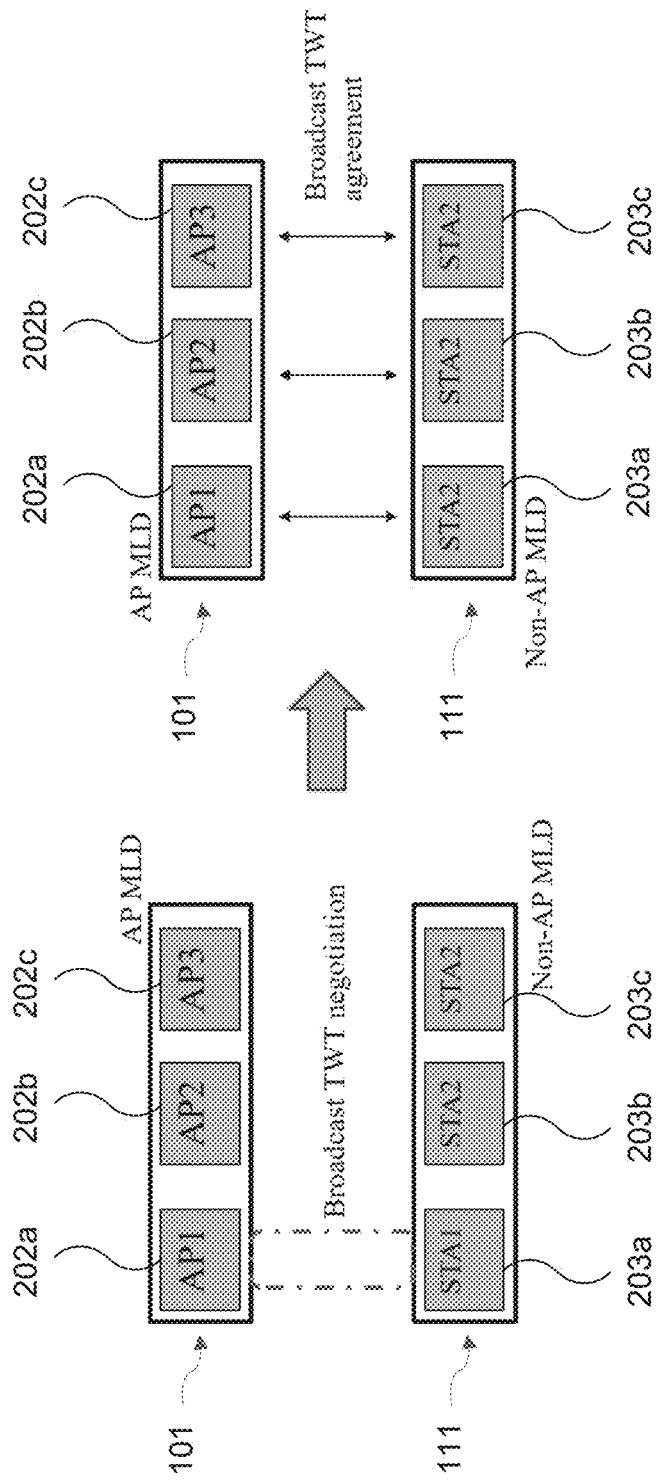
FIG. 4 illustrates an example process of broadcast TWT agreement setup for multiple links between an AP MLD and a non-AP MLD according to embodiments of the present disclosure.

FIG. 4 illustrates an example process of broadcast TWT agreement setup for multiple links between an AP MLD 101 and a non-AP MLD 111 according to embodiments of the present disclosure. For ease of explanation, the AP MLD 101 is illustrated with three affiliated APs and the non-AP MLD 111 is illustrated with three affiliated STAs, but it is understood that this process could be applied with suitable MLDs having any number of affiliated APs or STAs.

In the embodiment of FIG. 4, an ML setup operation has been performed between the AP MLD 101 and non-AP MLD 111, and links have been set up between AP1 and STA1, AP2 and STA2, and AP3 and STA3. Each of these links may operate at a different bandwidth (e.g., 2.4 GHz, 5 GHz, and 6 GHz, respectively).

To simplify a broadcast TWT agreement setup for multiple links, a STA affiliated with the non-AP MLD 111 may negotiate a broadcast TWT agreement with an AP affiliated with the AP MLD 101 on one setup link (the negotiating link), and the same broadcast TWT agreement can be applied to other STAs affiliated with the same non-AP MLD 111. The TWT SP for any MLD supporting broadcast TWT operation can be either trigger-based or non-trigger-based.

In the example of FIG. 4, STA1 (STA 203a) affiliated with the non-AP MLD 111 negotiates a broadcast TWT agreement over its link with AP1 (AP 202a). AP1 in this process may be referred to as the "TWT scheduling AP," and STA1 in this process may be referred to as the "TWT scheduled STA." The broadcast TWT agreement is for a shared TWT session that includes the negotiating link between STA1 and AP1 as well as the link between STA2 (STA 203b) and AP2 (AP 202b) and the link between STA3 (STA 203c) and AP3 (AP 202c).

After STA1 and AP1 successfully negotiate the broadcast TWT agreement, the non-AP MLD 111 and AP MLD 101 apply the same agreement to the other two links. Although this example illustrates negotiation of a broadcast TWT agreement for all links that are set up for MLO between non-AP MLD 111 and AP MLD 101, the broadcast TWT agreement may alternatively be negotiated to include a subset of the links rather than all of the links.

In some embodiments, to enable indication of a subset of the links for participation in a broadcast TWT agreement, a Link ID bitmap can be included in a Broadcast TWT Parameter Set field. If a bit in the Link ID bitmap is set to 1, it implies that the broadcast TWT parameters signaled in the Broadcast TWT Parameter Set are applicable to the corresponding link. Otherwise the broadcast TWT parameters signaled in the Broadcast TWT Parameter Set are not applicable to the corresponding link.

In some embodiments, the absence of the Link ID bitmap in the Broadcast TWT Parameter Set field implies that the broadcast TWT parameters signaled in the Broadcast TWT Parameter Set are applicable to the link on which the Broadcast TWT Parameter Set was transmitted, and not the other links.

The presence of the Link ID bitmap in a TWT element format can be indicated by a bit field of the Control field format of the TWT element format. This bit field can be shared with the indication for the type of TWT agreement (individual or broadcast). If the presence of the Link ID bitmap is indicated, and the negotiation type field indicates that the TWT element is for broadcast TWT, then the Link ID bitmap is for a broadcast TWT operation. If the presence of the Link ID bitmap is indicated, and the negotiation type field indicates that the TWT element is for individual TWT, then the Link ID bitmap is for an individual TWT operation.

As discussed herein above, various embodiments of this disclosure provide apparatuses and methods for supporting restricted TWT operation for MLDs that support broadcast TWT operation. Furthermore, various embodiments of this disclosure describe how Aligned Schedules can be applied to restricted TWT operation in MLDs, and how restricted TWT operation can coexist with broadcast TWT operation to which Aligned Schedules are applied in MLDs.

In the below embodiments, if a Broadcast TWT schedule is a Restricted TWT schedule, then the corresponding Broadcast TWT Parameter Set can be referred to as a Restricted TWT Parameter Set.

In various embodiments, a Restricted TWT SP is established over a first link between an AP affiliated with an AP MLD and a STA affiliated with a non-AP MLD. In some such embodiments, other links between the AP MLD and non-AP MLD may not have any other Broadcast TWT SP or Restricted TWT SP that overlaps with the Restricted TWT SP on the first link. In other such embodiments, other links between the AP MLD and non-AP MLD are allowed to have either Broadcast TWT SPs or Restricted TWT SPs that overlap with the Restricted TWT SP on the first link.

In various embodiments, a Restricted TWT schedule can also be an Aligned Schedule for MLDs, in which Restricted TWT SPs are scheduled to start at the same time across multiple links that are members of the Restricted TWT schedule. Restricted TWT SPs can be aligned across all links between an AP MLD and non-AP MLD as long as different links operate on different frequency bands. In such embodiments, even if a STA affiliated with a non-AP MLD transmits over one link during a period within a Restricted TWT SP on that link, all other STAs affiliated with the non-AP MLD can also transmit during the same Restricted TWT SP over the other links.

According to some other embodiments, Restricted TWT SPs can be aligned over a subset of links between an AP MLD and non-AP MLD that operate on different frequency bands. In such embodiments, even if a STA affiliated with a non-AP MLD transmits over one link during a period within a Restricted TWT SP on that link, the other STAs affiliated with the non-AP MLD can also transmit during the same Restricted TWT SP over the other links that are members of the Aligned Schedule.

In order to enable the indication of the links that the Aligned Schedule shall be applied to, a Link ID bitmap for Aligned Schedule can be included in a field of the corresponding Restricted TWT Parameter Set. For example, if a bit in the Link ID bitmap for Aligned Schedule is set to 1, it implies that the Aligned Schedule is applicable to the corresponding link. Otherwise, the Aligned Schedule is not applicable to the corresponding link. The Link ID bitmap for Aligned Schedule can be included in the TWT element transmitted by the AP MLD to indicate, e.g., Accept TWT, Alternate TWT, or Dictate TWT. Alternatively, the Link ID bitmap for Aligned Schedule can be included in the TWT element transmitted by the non-AP MLD to indicate, e.g., Request TWT, Demand TWT, or Suggest TWT.

When the AP MLD announces Restricted TWT schedules through Restricted TWT Parameter Sets, it can indicate whether or not a particular Restricted TWT schedule (corresponding to a particular Restricted TWT Parameter Set) is an Aligned schedule. Similarly, when a non-AP MLD suggests or demands Restricted TWT schedules for the links between the non-AP MLD and the AP MLD (by setting the TWT Setup Command field as Suggest TWT or Demand TWT, respectively), it can also indicate whether or not it wants the suggested or demanded Restricted TWT schedules to be aligned across multiple links.

In these embodiments, whether or not a particular Restricted TWT schedule is an Aligned Schedule can be indicated by a signaling bit in the corresponding Restricted TWT Parameter Set. For example, if the bit is set to 1, it indicates that the schedule corresponding to the Restricted TWT Parameter Set is an Aligned Schedule. Otherwise, the schedule corresponding to the Restricted TWT Parameter Set is not an Aligned Schedule. Either the AP MLD or the non-AP MLD can indicate whether a schedule is Aligned Schedule or not through the signaling bit in the TWT element it transmits.

In one embodiment, whenever there is a membership of a Restricted TWT schedule that is an Aligned Schedule over any link between the AP MLD and non-AP MLD, the Restricted TWT and Aligned Schedule is applicable to all other enabled links between the AP MLD and non-AP MLD.

In another embodiment, if a Restricted TWT schedule is an Aligned Schedule indicated by the Aligned Schedule signaling bit (or through some other signaling mechanism), then the absence of a Link ID bitmap for Aligned Schedule in the corresponding Restricted TWT Parameter Set in the TWT element transmitted from either the AP MLD or the non-AP MLD implies that the Aligned Schedule is applicable to all enabled links between the AP MLD and non-AP MLD.

In one embodiment, if an Aligned Schedule is present in a Broadcast TWT element that contains only a Restricted TWT Parameter Set, and that is sent in the Beacon frame (or any other frame) from the AP MLD to the non-AP MLD on any link between the AP MLD and the non-AP MLD, and if the AP MLD establishes the Aligned Schedule (which is also a Restricted TWT schedule) on that link, then the same Aligned Schedule shall also be established on other links between the AP MLD and non-AP MLD regardless of whether a Broadcast TWT element that contains only a Restricted TWT Parameter Set and that is sent in the Beacon frames (or any other frames) in the other links contains the same Aligned Schedule (the corresponding Restricted TWT Parameter Set), and regardless of whether the Beacon frames on other links contain any Broadcast TWT element that contains only a Restricted TWT Parameter Set.

In another embodiment, if an Aligned Schedule is present in a Broadcast TWT element that contains only a Restricted TWT Parameter Set, or that contains at least the Restricted TWT Parameter Set, and that is sent in the Beacon frame (or any other frame) from the AP MLD to the non-AP MLD on any link between the AP MLD and non-AP MLD, and the AP MLD establishes the Aligned Schedule (which is also a Restricted TWT schedule) on that link, then in order for the same Aligned Schedule to be established on any other links between the AP MLD and non-AP MLD, the respective link must also contain the same Aligned Schedule (the corresponding Restricted TWT Parameter Set) in a Broadcast TWT element in the Beacon frame (or any other frame) transmitted from the AP MLD to the non-AP MLD over the respective link.

Figure 5:
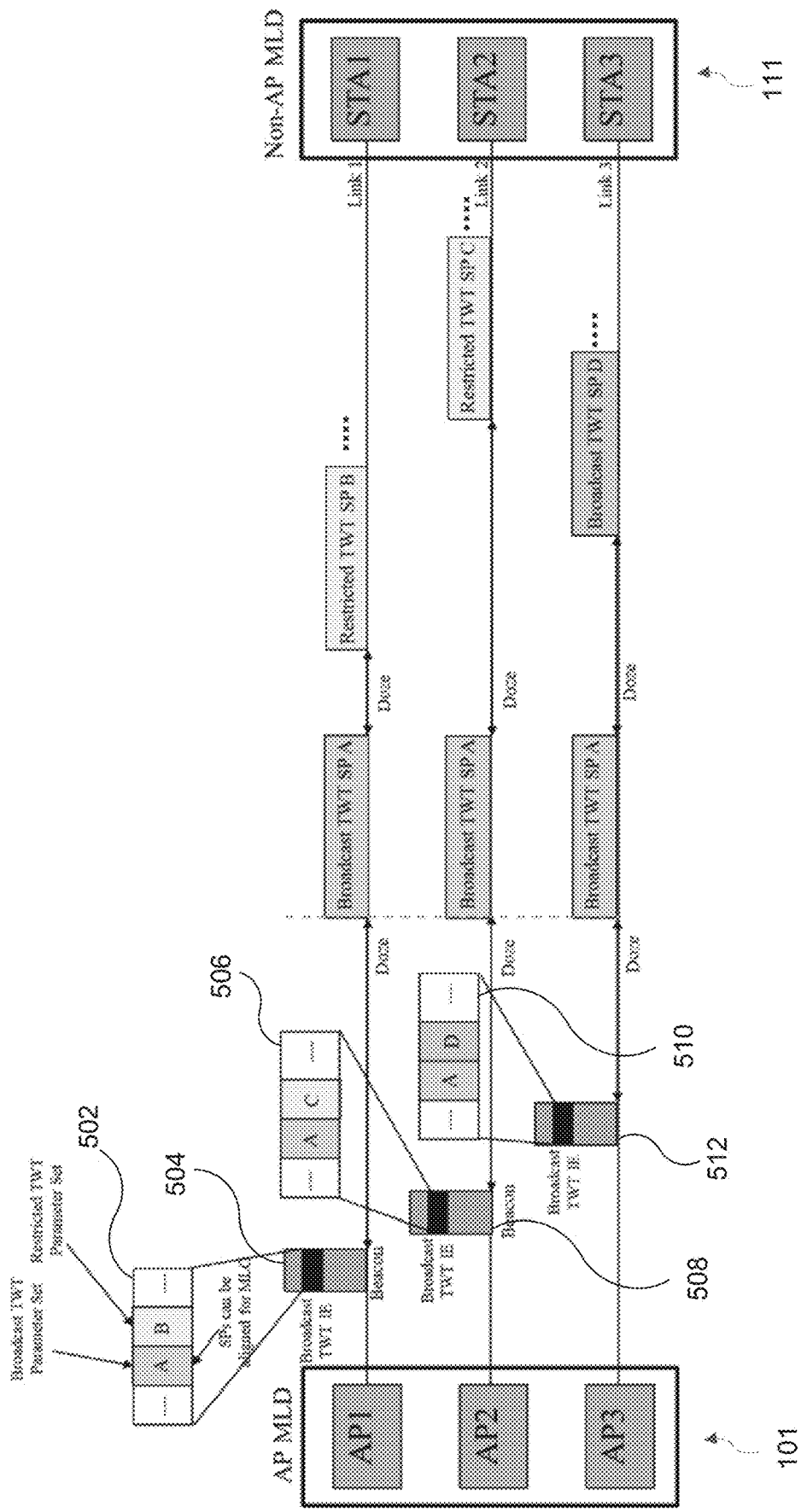
FIG. 5 illustrates an example of signaling by an AP MLD (a TWT scheduling AP MLD) to a non-AP MLD (a TWT scheduled non-AP MLD) that supports the coexistence of Restricted TWT scheduling with a Broadcast TWT Aligned Schedule according to various embodiments of the present disclosure.

FIG. 5 illustrates an example of signaling by an AP MLD (a TWT scheduling AP MLD) to a non-AP MLD (a TWT scheduled non-AP MLD) that supports the coexistence of Restricted TWT scheduling with a Broadcast TWT Aligned Schedule according to various embodiments of the present disclosure. In this example, three links are set up between the AP MLD and non-AP MLD (Link 1 between AP1 and STA1, Link 2 between AP2 and STA2, and Link3 between AP3 and STA3). Both the AP MLD and non-AP MLD support Broadcast TWT operation as well as Restricted TWT operation, and a broadcast TWT agreement has been established between them with all three links participating.

The TWT scheduling AP MLD announces the existence of a Broadcast TWT Parameter Set (Broadcast TWT Parameter Set A) and a Restricted TWT Parameter Set (Restricted TWT Parameter Set B) in the Broadcast TWT IE 502 transmitted in the Beacon frame 504 to the non-AP MLD over Link 1. Moreover, the AP MLD indicates that the Broadcast TWT schedule corresponding to Broadcast TWT Parameter Set A is an Aligned Schedule.

Another Broadcast TWT IE 506 is included in the Beacon frame 508 transmitted from AP2 to STA2 over Link 2. This IE includes the Broadcast TWT Parameter Set A and a Restricted TWT Parameter Set C. In another Beacon frame 512 transmitted from AP3 to STA3 over Link 3, a Broadcast TWT IE 510 is included with Broadcast TWT Parameter Set A and a Broadcast TWT Parameter Set D. In this example, the Link ID bitmap for Aligned Schedule corresponding to Broadcast TWT Parameter Set A is absent in all of the Broadcast TWT Parameter Sets.

The TWT scheduling AP MLD indicates Accept TWT in the TWT Setup Command field, and in this way sets up an Aligned Schedule corresponding to Broadcast TWT Parameter Set A across all three links between the AP MLD and non-AP MLD. Furthermore, two Restricted TWT schedules are established over Link 1 and Link 2 corresponding to Restricted TWT Parameter Set B and Restricted TWT Parameter Set C, respectively, and another Broadcast TWT schedule corresponding to Broadcast TWT Parameter Set D is established on Link 3.

Figure 6:
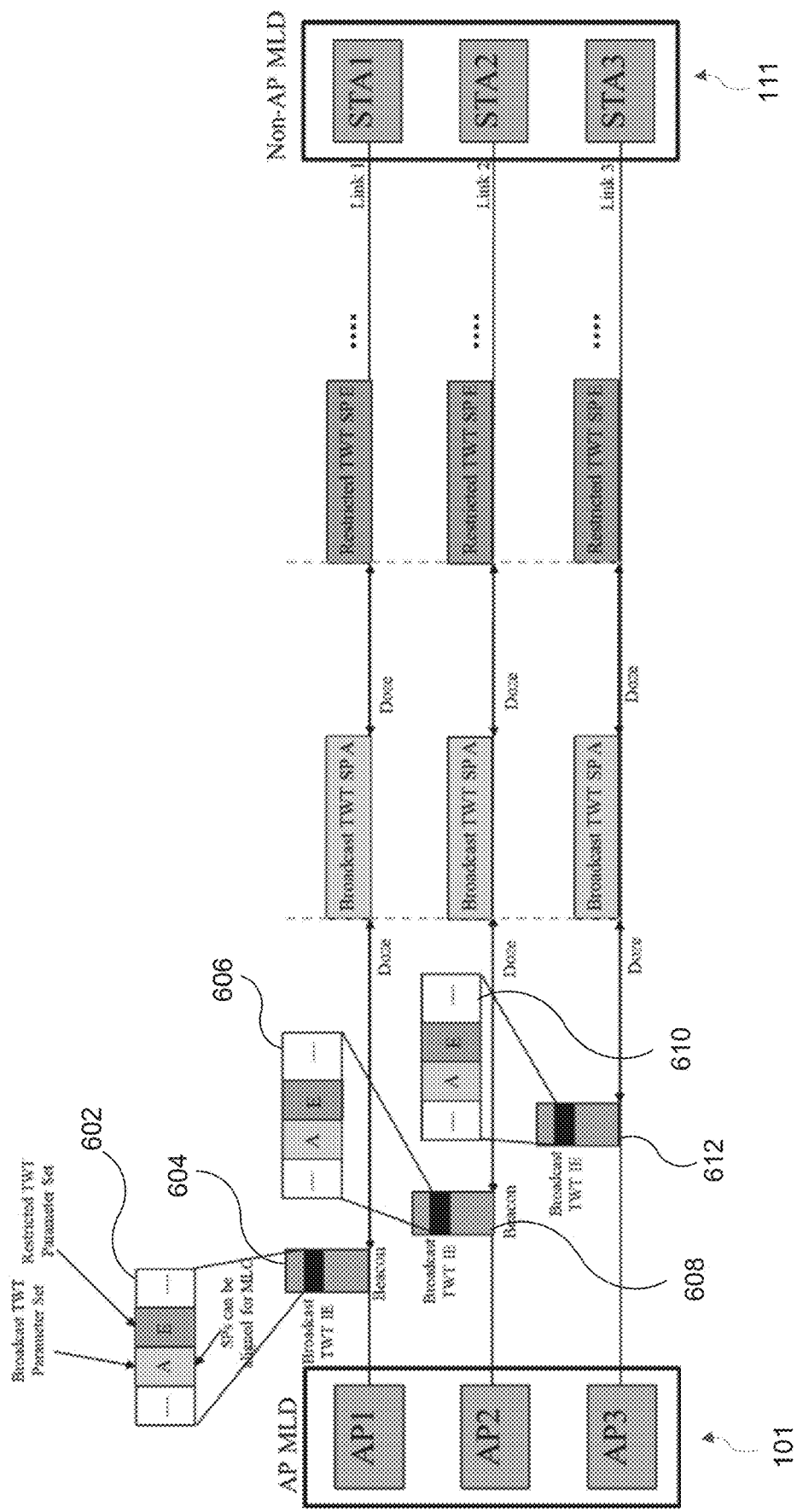
FIG. 6 illustrates an example of signaling by an AP MLD (a TWT scheduling AP MLD) to a non-AP MLD (a TWT scheduled non-AP MLD) that supports a Restricted TWT Aligned Schedule and its coexistence with a Broadcast TWT Aligned Schedule according to various embodiments of the present disclosure.

FIG. 6 illustrates an example of signaling by an AP MLD (a TWT scheduling AP MLD) to a non-AP MLD (a TWT scheduled non-AP MLD) that supports a Restricted TWT Aligned Schedule and its coexistence with a Broadcast TWT Aligned Schedule according to various embodiments of the present disclosure. In this example, similar to the example of FIG. 5, three links are set up between the AP MLD and non-AP MLD (Link 1 between AP1 and STA1, Link 2 between AP2 and STA2, and Link3 between AP3 and STA3). Both the AP MLD and non-AP MLD support Broadcast TWT operation as well as Restricted TWT operation, and a broadcast TWT agreement has been established between them with all three links participating.

The TWT scheduling AP MLD announces the existence of a Broadcast TWT Parameter Set (Broadcast TWT Parameter Set A) and a Restricted TWT Parameter Set (Restricted TWT Parameter Set E) in the Broadcast TWT IE 602 transmitted in the Beacon frame 604 to the non-AP MLD over Link 1. Moreover, the AP MLD indicates that the Broadcast TWT schedule corresponding to Broadcast TWT Parameter Set A is an Aligned Schedule, and that the Restricted TWT schedule corresponding to Restricted TWT Parameter Set E is an Aligned Schedule.

Another Broadcast TWT IE 606 is included in the Beacon frame 608 transmitted from AP2 to STA2 over Link 2. This IE includes the Broadcast TWT Parameter Set A and the Restricted TWT Parameter Set E. In another Beacon frame 612 transmitted from AP3 to STA3 over Link 3, a Broadcast TWT IE 610 is included with Broadcast TWT Parameter Set A and a Restricted TWT Parameter Set E. In this example, the Link ID bitmaps for Aligned Schedules corresponding to Broadcast TWT Parameter Set A and Restricted TWT Parameter Set E are absent in all of the Broadcast TWT Parameter Sets and Restricted TWT Parameter Sets.

The TWT scheduling AP MLD indicates Accept TWT in the TWT Setup Command field, and in this way sets up an Aligned Schedule corresponding to Broadcast TWT Parameter Set A across all three links between the AP MLD and non-AP MLD. Moreover, the Aligned Schedule corresponding to Restricted TWT Parameter Set E is also established across all three links between the AP MLD and non-AP MLD.

Figure 7:
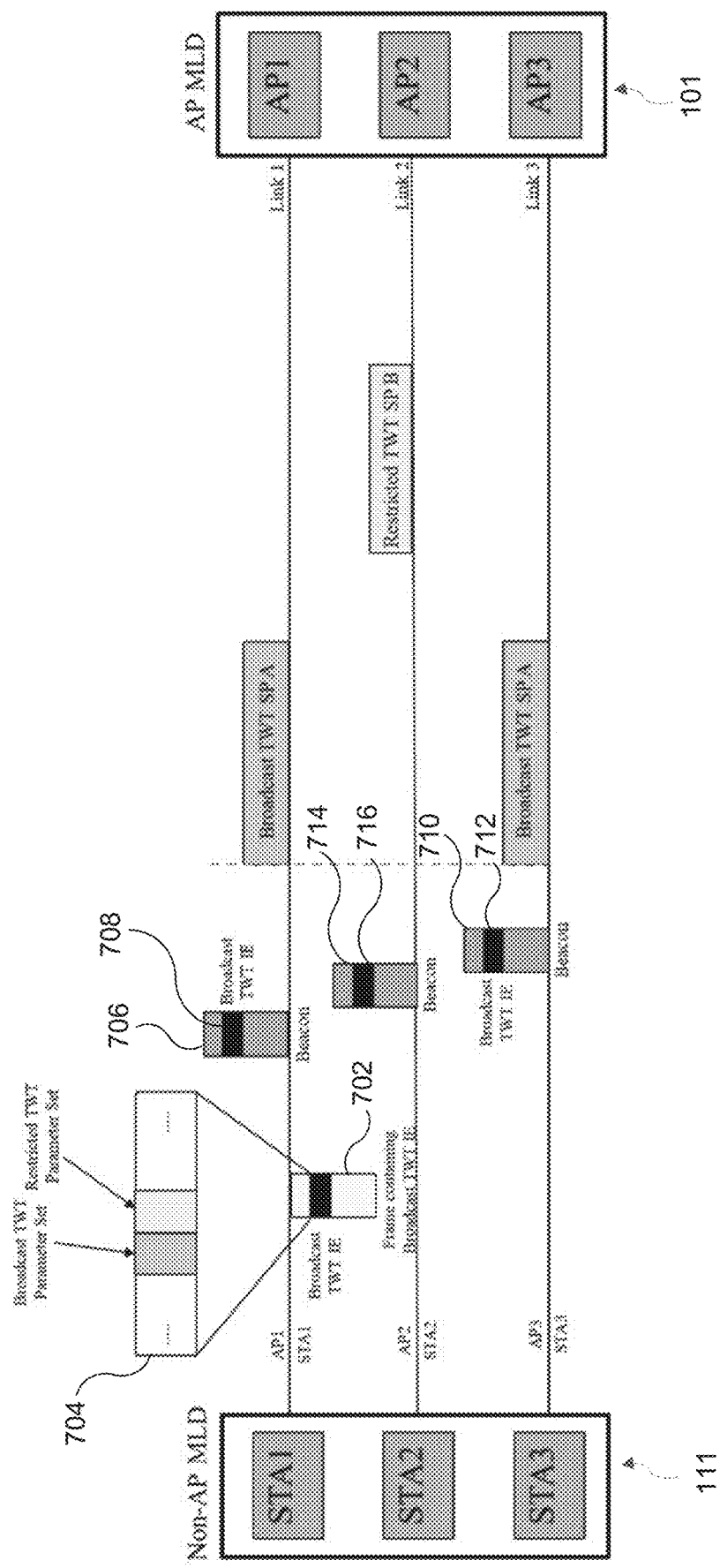
FIG. 7 illustrates an example of signaling by a non-AP MLD to an AP MLD that supports the coexistence of Restricted TWT scheduling with a Broadcast TWT Aligned Schedule according to various embodiments of the present disclosure.

FIG. 7 illustrates an example of signaling by a non-AP MLD to an AP MLD that supports the coexistence of Restricted TWT scheduling with a Broadcast TWT Aligned Schedule according to various embodiments of the present disclosure. In this example, similar to the example of FIG. 5, three links are set up between the AP MLD and non-AP MLD (Link 1 between AP1 and STA1, Link 2 between AP2 and STA2, and Link3 between AP3 and STA3). Both the AP MLD and non-AP MLD support Broadcast TWT operation as well as Restricted TWT operation, and a broadcast TWT agreement has been established between them with all three links participating.

The non-AP MLD transmits to the AP MLD a TWT initiating frame 702 on Link 1 containing a Broadcast TWT element 704, and suggests a broadcast TWT schedule (included in a Broadcast TWT Parameter Set and corresponding to Broadcast TWT SP A) and a Restricted TWT schedule (included in a Restricted TWT Parameter Set and corresponding to Restricted TWT SP B) by setting the TWT Setup Command field to Suggest TWT. Moreover, the non-AP MLD indicates to the AP MLD that it wants the Broadcast TWT schedule to be an Aligned Schedule. The Broadcast TWT element 704 also contains a Link ID bitmap for Aligned Schedule in the Broadcast TWT Parameter Set, which indicates in this example that the non-AP MLD wants the Aligned Schedule to be set up on Link 1 and Link 3 (but not Link 2).

The AP MLD responds to the non-AP MLD's suggestion with acceptance. The AP MLD creates a Broadcast TWT schedule with the same Broadcast TWT Parameter Set contained in the Broadcast TWT IE 704 in the TWT initiating frame 702 transmitted by the non-AP MLD. The AP MLD then transmits to the non-AP MLD over Link 1 and Link 3 Beacon frames 706 and 710, respectively, including Broadcast TWT IEs 708 and 712, respectively, that contain that Broadcast TWT Parameter Set and indicate Accept TWT in the respective TWT Setup Command field. The AP MLD also indicates that the corresponding schedule across Link 1 and Link 3 is the Aligned Schedule. The Broadcast TWT Aligned Schedule is thereby set up across Link 1 and Link 3.

The AP MLD also creates a Restricted TWT schedule with the same Restricted TWT Parameter Set contained in the Broadcast TWT IE 704 in the TWT initiating frame 702 transmitted by the non-AP MLD. The AP MLD then transmits to the non-AP MLD over Link 2 a Beacon frame 714 including Broadcast TWT IE 716 that contains the Restricted TWT Parameter Set and indicates Accept TWT in the respective TWT Setup Command field. A Restricted TWT schedule corresponding to the Restricted TWT Parameter Set is thereby set up on Link 2.

Figure 8:
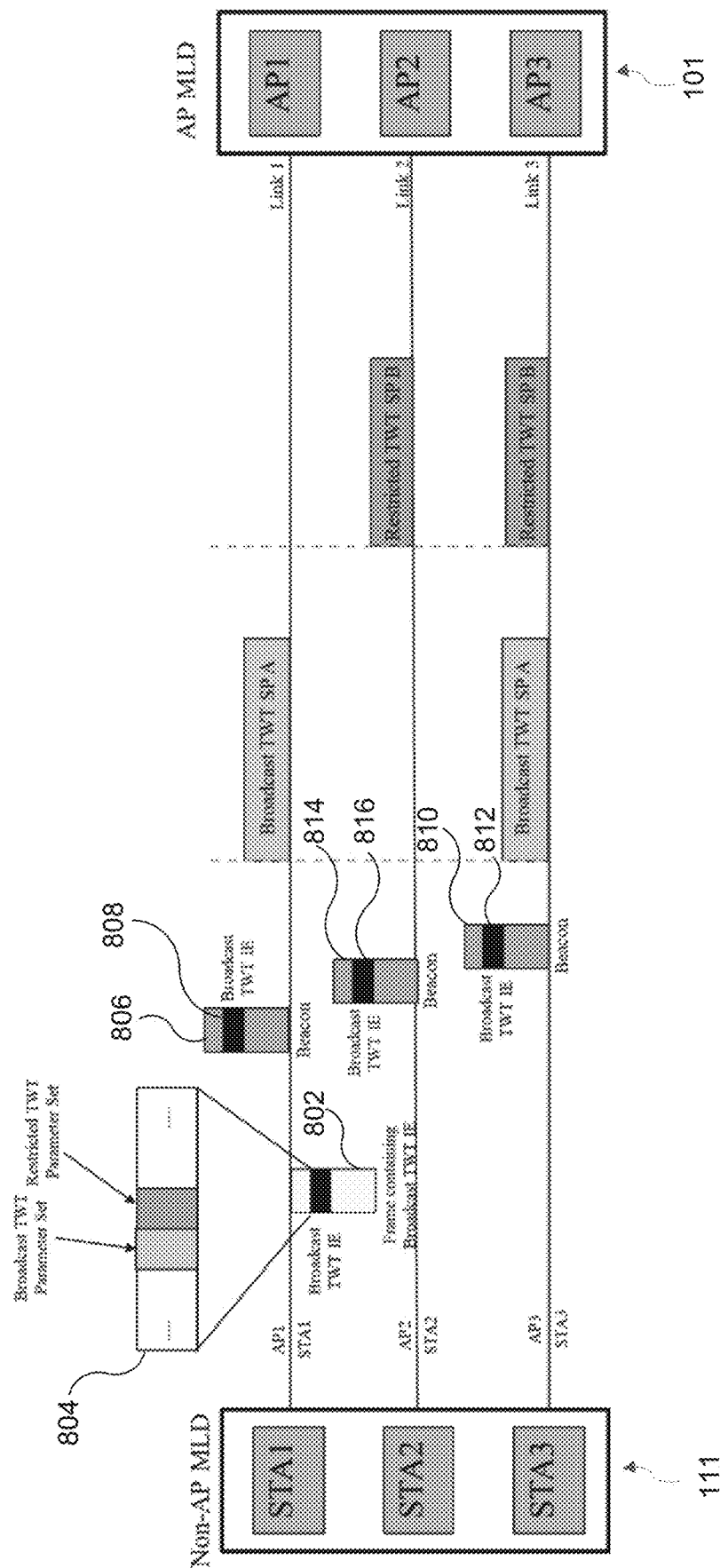
FIG. 8 illustrates an example of signaling by a non-AP MLD to an AP MLD that supports a Restricted TWT Aligned Schedule and its coexistence with a Broadcast TWT Aligned Schedule according to various embodiments of the present disclosure.

FIG. 8 illustrates an example of signaling by a non-AP MLD to an AP MLD that supports a Restricted TWT Aligned Schedule and its coexistence with a Broadcast TWT Aligned Schedule according to various embodiments of the present disclosure. In this example, similar to the example of FIG. 7, three links are set up between the AP MLD and non-AP MLD (Link 1 between AP1 and STA1, Link 2 between AP2 and STA2, and Link3 between AP3 and STA3). Both the AP MLD and non-AP MLD support Broadcast TWT operation as well as Restricted TWT operation, and a broadcast TWT agreement has been established between them with all three links participating.

The non-AP MLD transmits to the AP MLD a TWT initiating frame 802 on Link 1 containing a Broadcast TWT element 804, and suggests a broadcast TWT schedule (included in a Broadcast TWT Parameter Set and corresponding to Broadcast TWT SP A) and a Restricted TWT schedule (included in a Restricted TWT Parameter Set and corresponding to Restricted TWT SP B) by setting the TWT Setup Command field to Suggest TWT. Moreover, the non-AP MLD indicates to the AP MLD that it wants both the Broadcast TWT schedule and the Restricted TWT schedule to be Aligned Schedules. The Broadcast TWT element 804 also contains a Link ID bitmap for Aligned Schedule in the Broadcast TWT Parameter Set, which indicates in this example that the non-AP MLD wants the Aligned Schedule corresponding to the Broadcast TWT Parameter Set to be set up on Link 1 and Link 3 (but not Link 2). The Broadcast TWT element 804 further contains a Link ID bitmap for Aligned Schedule in the Restricted TWT Parameter Set, which indicates in this example that the non-AP MLD wants the Aligned Schedule corresponding to the Restricted TWT Parameter Set to be set up on Link 2 and Link 3 (but not Link 1).

The AP MLD responds to the non-AP MLD's suggestion with acceptance. The AP MLD creates a Broadcast TWT schedule with the same Broadcast TWT Parameter Set contained in the Broadcast TWT IE 804 in the TWT initiating frame 802 transmitted by the non-AP MLD. The AP MLD then transmits to the non-AP MLD over Link 1 and Link 3 Beacon frames 806 and 810, respectively, including Broadcast TWT IEs 808 and 812, respectively, that contain the Broadcast TWT Parameter Set and indicate Accept TWT in the respective TWT Setup Command field. The AP MLD also indicates that the corresponding Broadcast TWT schedule across Link 1 and Link 3 is the Aligned Schedule. The Broadcast TWT Aligned Schedule is thereby set up across Link 1 and Link 3.

The AP MLD also creates a Restricted TWT schedule with the same Restricted TWT Parameter Set contained in the Broadcast TWT IE 804 in the TWT initiating frame 802 transmitted by the non-AP MLD. The AP MLD then transmits to the non-AP MLD over Link 2 a Beacon frame 814 including Broadcast TWT IE 816 that contains the Restricted TWT Parameter Set and indicates Accept TWT in the respective TWT Setup Command field. Additionally, the Broadcast TWT IE 812 included in the Beacon frame 810 transmitted to the non-AP MLD over Link 3 contains the Restricted TWT Parameter Set. The AP MLD also indicates that the corresponding Restricted TWT schedule across Link 2 and Link 3 is the Aligned Schedule. The Restricted TWT Aligned Schedule is thereby set up on Link 2 and Link 3.

Figure 9:
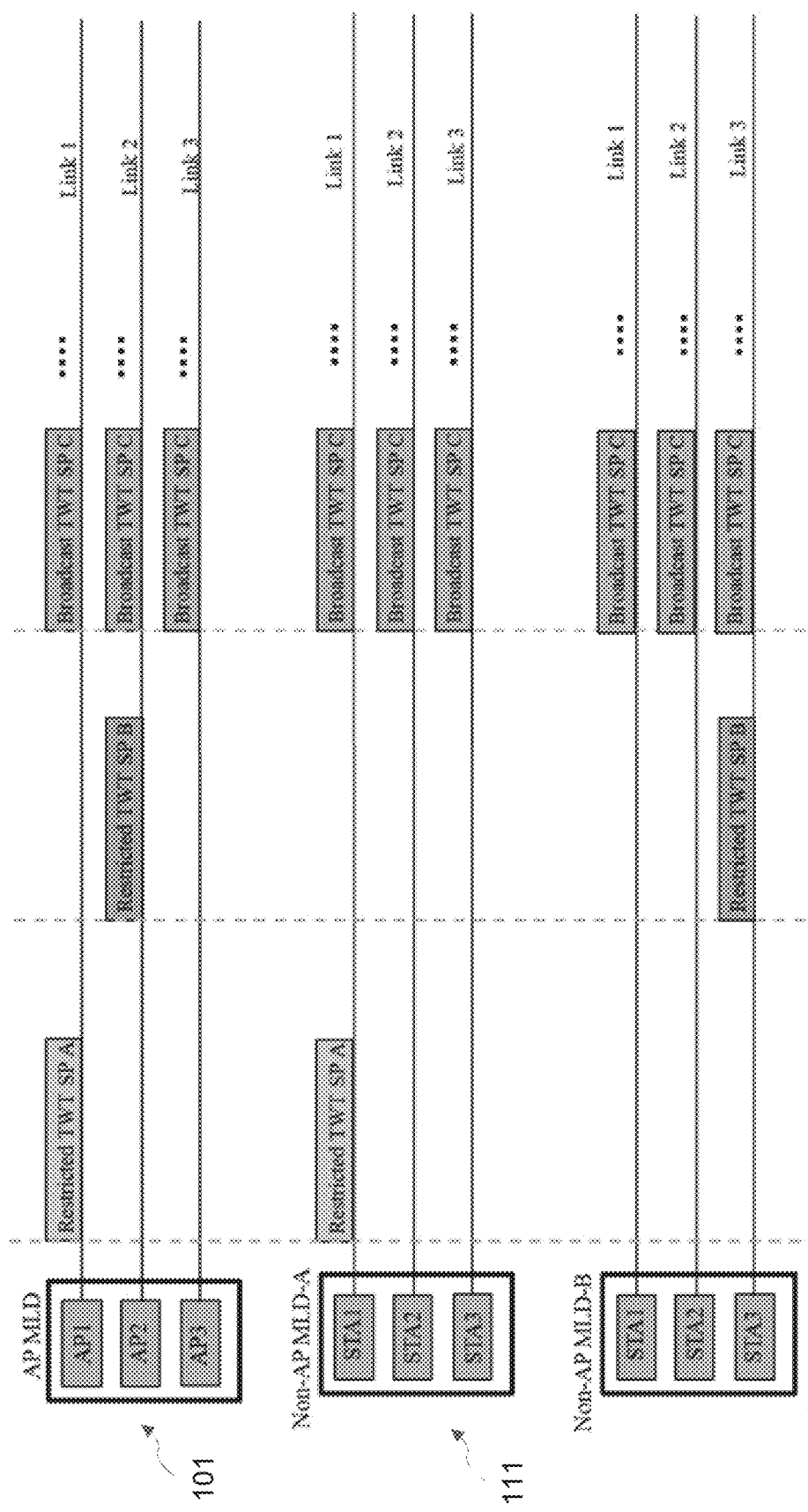
FIG. 9 illustrates an example of Restricted TWT operation coexisting with Broadcast TWT Aligned Scheduling across multiple MLDs according to embodiments of the present disclosure.
Figure 10:
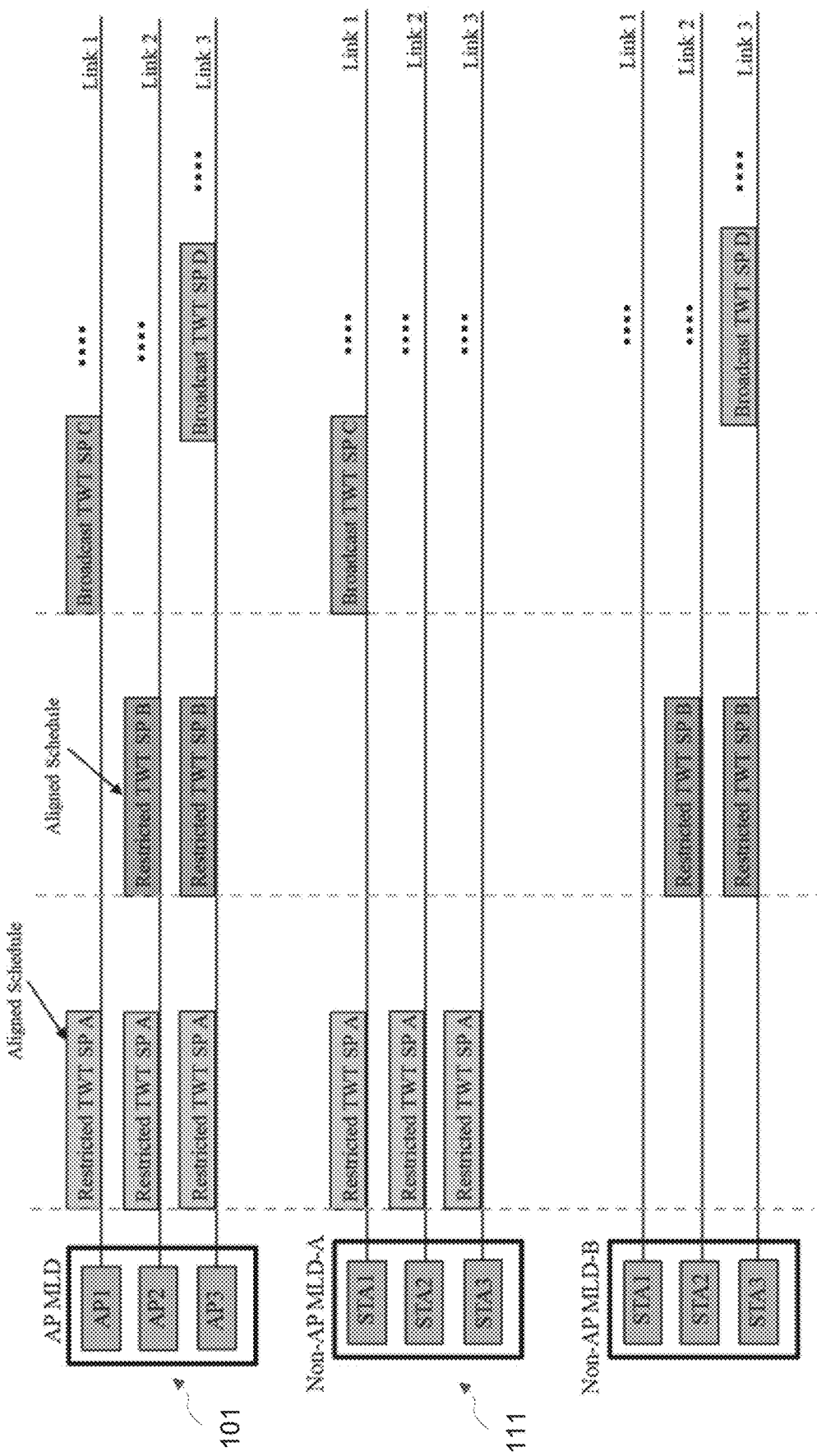
FIG. 10 illustrates an example of Restricted TWT Aligned Scheduling coexisting with Broadcast TWT operation across multiple MLDs according to embodiments of the present disclosure.

In various embodiments of the present disclosure, an AP MLD may establish Aligned Schedules between multiple non-AP MLDs. FIGS. 9 and 10 illustrate examples of these embodiments.

FIG. 9 illustrates an example of Restricted TWT operation coexisting with Broadcast TWT Aligned Scheduling across multiple MLDs according to embodiments of the present disclosure. As illustrated, the AP MLD has established a Broadcast TWT Aligned Schedule across all links between the AP MLD and multiple non-AP MLDs.

In this example, if the AP MLD sets up a Restricted TWT schedule on a first link (operating on a certain frequency band), e.g., Link 1, between the AP MLD and a first non-AP MLD, e.g., non-AP MLD-A, then the AP MLD does not set up another Restricted TWT schedule on another link between the AP MLD and another non-AP MLD (e.g., non-AP MLD-B), where the other link also operates on the same frequency band as the first link.

According to some other embodiments, even if the AP MLD sets up a restricted TWT schedule on one link (operating on a certain frequency band) between the AP MLD and a first non-AP MLD, the AP MLD can still set up the same restricted TWT schedule on another link between the AP MLD and a second non-AP MLD. This latter link between the AP MLD and the second non-AP MLD can either operate on the same frequency band as that between the AP MLD and the first non-AP MLD, or can operate on a different frequency band from that between the AP MLD and first non-AP MLD FIG. 10 illustrates an example of Restricted TWT Aligned Scheduling coexisting with Broadcast TWT operation across multiple MLDs according to embodiments of the present disclosure. As illustrated, the AP MLD has established Broadcast TWT schedules between the AP MLD and multiple non-AP MLDs.

In this example, if the AP MLD sets up a Restricted TWT Aligned Schedule across all or a subset of links between the AP MLD and a first non-AP MLD, e.g., non-AP MLD-A, then the AP MLD does not set up another Restricted TWT Aligned Schedule with another non-AP MLD, where the latter Restricted TWT Aligned Schedule operates on one or multiple frequency bands that are common with those of the Restricted TWT Aligned Schedule with the first non-AP MLD.

According to some other embodiments, even if the AP MLD sets up a Restricted TWT Aligned Schedule with a first non-AP MLD across all or a subset of enabled links between the AP MLD and the first non-AP MLD, the AP MLD can still set up the same Restricted TWT Aligned Schedule across all or a subset of enabled links between the AP MLD and a second non-AP MLD, regardless of whether the Restricted TWT Aligned Schedule with the second non-AP MLD operates on one or multiple frequency bands that are common with those of the Restricted TWT Aligned Schedule with the first non-AP MLD.

Figure 11:
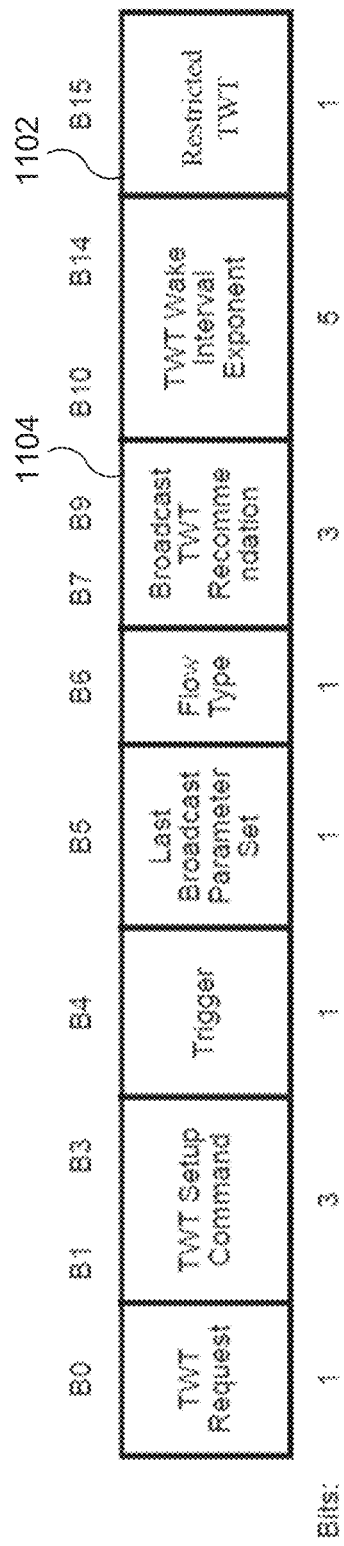
FIG. 11 illustrates an example of a Request Type field format of a Broadcast TWT Parameter Set according to embodiments of the present disclosure.

According to various embodiments of the present disclosure, whether or not a Broadcast TWT schedule is a Restricted TWT schedule can be indicated by a Restricted TWT subfield in the Request Type field format in a Broadcast TWT Parameter Set. FIG. 11 illustrates an example of a Request Type field format of a Broadcast TWT Parameter Set according to embodiments of the present disclosure. If the Restricted TWT subfield 1102 is set to 1, the corresponding Broadcast TWT schedule is a Restricted TWT schedule. If the Restricted TWT subfield 1102 is set to 0, the corresponding Broadcast TWT schedule is not a Restricted TWT schedule.

In some embodiments, whether or not this Restricted TWT schedule is also an Aligned Schedule can be identified by setting a particular value (e.g., a value of 5) in the Broadcast TWT Recommendation field 1104 in the Request Type field in Broadcast TWT Parameter Set, as shown in Table 1. Alternatively, other values between 4 and 7 (from the Reserved values) in the Broadcast TWT Recommendation field 1104 can also be used to indicate an Aligned Schedule.

TABLE 1

| Broadcast TWT Recommendation field value | Description when transmitted in a broadcast TWT element |
|---|---|
| 0 | No constraints on the frames transmitted during a broadcast TWT SP |
| 1 | Frames transmitted during a broadcast TWT SP by a TWT scheduled STA are recommended to be limited to solicited status and solicited feedback: PS-Poll and QoS Null frames Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.) Feedback in an HE TB feedback NDP, if solicited by the AP (see 26.5.7 (NDP feedback report procedure)) BQRs (see 26.5.6 (Bandwidth query report operation)) BSRs (see 26.5.5 (Buffer status report operation)) Frames that are sent as part of a sounding feedback exchange (see 26.7 (HE sounding protocol)) Management frames: Action or Action No Ack frames Control response frames Trigger frames transmitted by the TWT scheduling AP during the broadcast TWT SP do not contain RUs for random access (see 26.8.3.2 (Rules for TWT scheduling AP) and 26.5.4 (UL OFDMA-based random access (UORA))), otherwise, there are no other restrictions on the frames transmitted by the TWT scheduling AP. |
| 2 | Frames transmitted during a broadcast TWT SP by a TWT scheduled STA are recommended to be limited to solicited status and solicited feedback: PS-Poll and QoS Null frames Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.) BQRs (see 26.5.6 (Bandwidth query report operation)) BSRs (see 26.5.5 (Buffer status report operation)) Frames that are sent as part of a sounding feedback exchange (see 26.7 (HE sounding protocol)) Management frames: Action, Action No Ack frames or (Re)Association Request Control response frames Trigger frames transmitted by the TWT scheduling AP during the broadcast TWT SP contain at least one RU for random access (see 26.8.3.2 (Rules for TWT scheduling AP) and 26.5.4 (UL OFDMA-based random access (UORA))), otherwise there are no restrictions on the frames transmitted by the TWT scheduling AP. |
| 3 | No constraints on the frames transmitted during a broadcast TWT SP except that the AP transmits a TIM frame or a FILS Discovery frame including a TIM element at the beginning of each TWT SP (see 26.14.3.2 (AP operation for opportunistic power save)). |
| 4 | Reserved |
| 5 | Broadcast TWT schedule is an Aligned Schedule. Frames are transmitted during this Aligned TWT SP. |
| 6-7 | Reserved |

In other embodiments, whether or not a Broadcast TWT schedule is a Restricted TWT schedule can be determined by the value of Broadcast TWT Recommendation field 1104 in the Request Type field in the Broadcast TWT Parameter Set. In one embodiment, if the value of the Broadcast TWT Recommendation field 1104 is set to 4 it indicates that the schedule is a Restricted TWT schedule, as shown in Table 2. Alternatively, other values between 5 and 7 (from the Reserved values) in the Broadcast TWT Recommendation field 1104 can also be used to indicate that the Broadcast TWT schedule is a Restricted TWT schedule. The Restricted TWT subfield 1102 may be omitted in cases where the Broadcast TWT Recommendation field 1104 is used to indicate whether the Broadcast TWT schedule is a Restricted TWT schedule.

TABLE 2

| Broadcast TWT Recommendation field value | Description when transmitted in a broadcast TWT element |
|---|---|
| 0 | No constraints on the frames transmitted during a broadcast TWT SP |
| 1 | Frames transmitted during a broadcast TWT SP by a TWT scheduled STA are recommended to be limited to solicited status and solicited feedback: PS-Poll and QoS Null frames Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.) Feedback in an HE TB feedback NDP, if solicited by the AP (see 26.5.7 (NDP feedback report procedure)) BQRs (see 26.5.6 (Bandwidth query report operation)) BSRs (see 26.5.5 (Buffer status report operation)) Frames that are sent as part of a sounding feedback exchange (see 26.7 (HE sounding protocol)) Management frames: Action or Action No Ack frames Control response frames Trigger frames transmitted by the TWT scheduling AP during the broadcast TWT SP do not contain RUs for random access (see 26.8.3.2 (Rules for TWT scheduling AP) and 26.5.4 (UL OFDMA-based random access (UORA))), otherwise, there are no other restrictions on the frames transmitted by the TWT scheduling AP. |
| 2 | Frames transmitted during a broadcast TWT SP by a TWT scheduled STA are recommended to be limited to solicited status and solicited feedback: PS-Poll and QoS Null frames Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.) BQRs (see 26.5.6 (Bandwidth query report operation)) BSRs (see 26.5.5 (Buffer status report operation)) Frames that are sent as part of a sounding feedback exchange (see 26.7 (HE sounding protocol)) Management frames: Action, Action No Ack frames or (Re)Association Request Control response frames Trigger frames transmitted by the TWT scheduling AP during the broadcast TWT SP contain at least one RU for random access (see 26.8.3.2 (Rules for TWT scheduling AP) and 26.5.4 (UL OFDMA-based random access (UORA))), otherwise there are no restrictions on the frames transmitted by the TWT scheduling AP. |
| 3 | No constraints on the frames transmitted during a broadcast TWT SP except that the AP transmits a TIM frame or a FILS Discovery frame including a TIM element at the beginning of each TWT SP (see 26.14.3.2 (AP operation for opportunistic power save)). |
| 4 | Broadcast TWT schedule is a Restricted TWT Schedule |
| 5-7 | Reserved |

Figure 12:
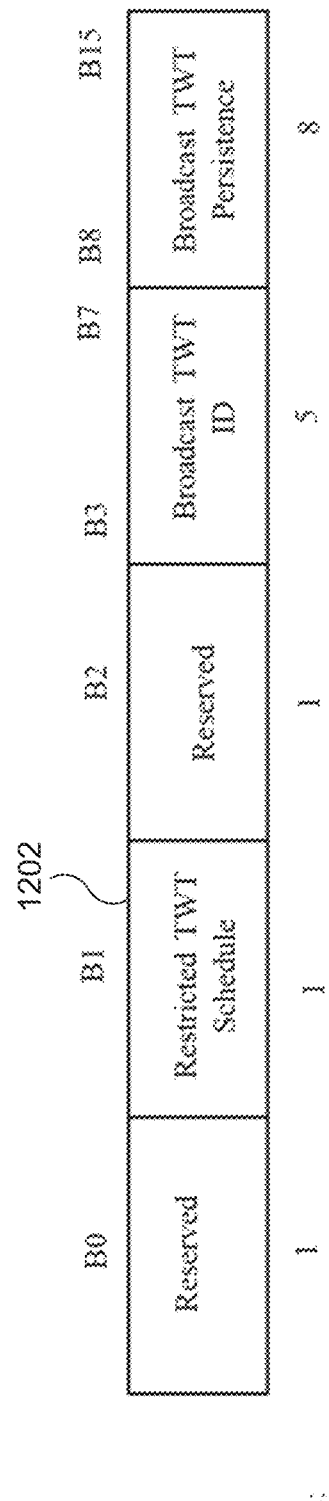
FIG. 12 illustrates an example of a Broadcast TWT Info subfield format of a Broadcast TWT Parameter Set according to embodiments of the present disclosure.

According to various embodiments of the present disclosure, whether or not a Broadcast TWT schedule is a Restricted TWT schedule can be indicated by a Restricted TWT Schedule subfield in the Broadcast TWT Info subfield in the Broadcast TWT Parameter Set field. FIG. 12 illustrates an example of a Broadcast TWT Info subfield format of a Broadcast TWT Parameter Set according to embodiments of the present disclosure. If the Restricted TWT Schedule subfield 1202 is set to 1, it indicates the corresponding Broadcast TWT schedule is a Restricted TWT schedule. If the Restricted TWT Schedule subfield 1202 is set to 0, it indicates the corresponding Broadcast TWT schedule is not a Restricted TWT schedule.

Figure 13:
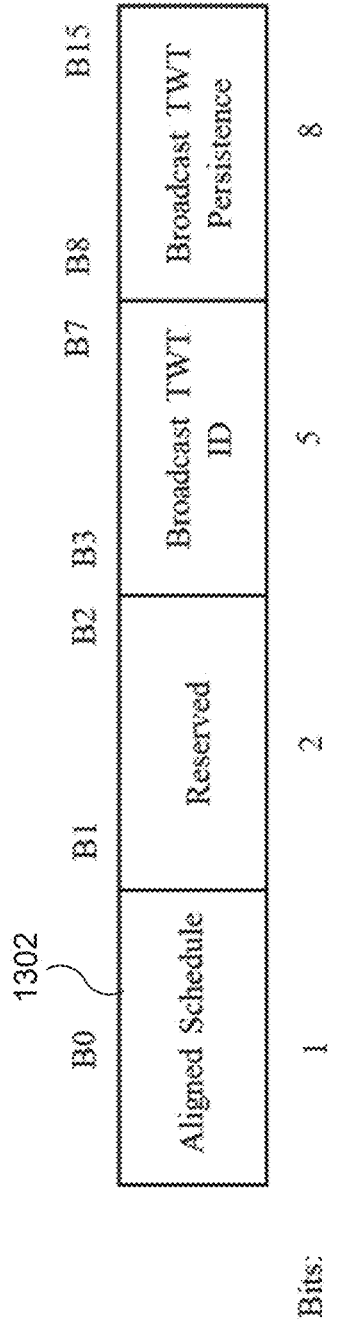
FIG. 13 illustrates an example of a Broadcast TWT Info subfield format of a Broadcast TWT Parameter Set according to embodiments of the present disclosure.

According to another embodiment, whether or not a Broadcast TWT schedule is an Aligned Schedule can be indicated by the Aligned Schedule subfield in the Broadcast TWT Info subfield in the Broadcast TWT Parameter Set field. FIG. 13 illustrates such an example of a Broadcast TWT Info subfield format of a Broadcast TWT Parameter Set. If the Aligned Schedule subfield 1302 is set to 1, it indicates that the corresponding Broadcast TWT schedule is an Aligned Schedule. If the Aligned Schedule subfield 1302 is set to 0, it indicates the corresponding Broadcast TWT schedule is not an Aligned Schedule.

Figure 14:
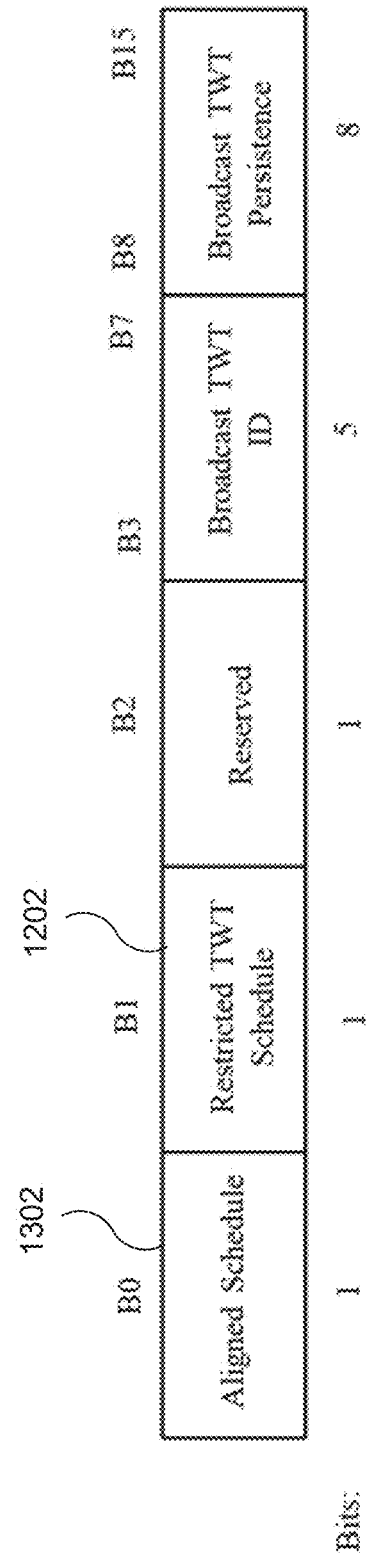
FIG. 14 illustrates another example of a Broadcast TWT Info subfield format of a Broadcast TWT Parameter Set according to embodiments of the present disclosure.

According to yet another embodiment, the presence of both the Aligned Schedule subfield 1302 and the Restricted TWT Schedule subfield 1202 in the Broadcast TWT Info subfield may indicate whether the Broadcast TWT schedule is an Aligned Schedule, a Restricted TWT schedule, both, or neither. FIG. 14 illustrates such an example of a Broadcast TWT Info subfield format of a Broadcast TWT Parameter Set. In other embodiments, any Reserved bits between B0 and B2 can be used to indicate this combination of Aligned Schedule and Restricted TWT Schedule.

According to various embodiments of the present disclosure, if a Broadcast TWT schedule is an Aligned Schedule, then a Broadcast TWT Link ID Bitmap field may be present in the Broadcast TWT Parameter Set to indicate the links (between the AP MLD and non-AP MLD) for which the Aligned Schedule is applicable. FIG. 15 illustrates such an example of a Broadcast TWT Parameter Set including a Broadcast TWT Link ID Bitmap field 1502.

According to other embodiments, whether or not a particular Broadcast TWT schedule is applicable to more than one link between the AP MLD and non-AP MLD may be indicated by a Broadcast TWT Link ID Bitmap Present subfield in the Request Type field in the Broadcast TWT Parameter Set. FIG. 16 illustrates such an example of a Request Type field format of a Broadcast TWT Parameter Set. If the Broadcast TWT Link ID Bitmap Present subfield 1602 is set to 1, then Broadcast TWT Link ID Bitmap subfield will be present in the Broadcast TWT Parameter Set to indicate the links for which the Broadcast TWT schedule is applicable. If the Broadcast TWT Link ID Bitmap Present subfield 1602 is set to 0, then the Broadcast TWT Link ID Bitmap subfield is not present in the Broadcast TWT Parameter Set field.

According to another embodiment, whether or not a particular Broadcast TWT schedule is applicable to more than one link between the AP MLD and non-AP MLD may be indicated by a bTWT Link ID Bitmap Present subfield in the Broadcast TWT Info subfield in the Broadcast TWT Parameter Set. FIG. 17 illustrates such an example of a Broadcast TWT Info subfield format of a Broadcast TWT Parameter Set. If the bTWT Link ID Bitmap Present subfield 1702 is set to 1, then Broadcast TWT Link ID Bitmap subfield will be present in the Broadcast TWT Parameter Set to indicate the links for which the Broadcast TWT schedule is applicable. If the bTWT Link ID Bitmap Present subfield 1702 is set to 0, then Broadcast TWT Link ID Bitmap subfield will not be present in the Broadcast TWT Parameter Set field.

According to various embodiments of the present disclosure, if a Broadcast TWT schedule is an Aligned Schedule or Restricted TWT schedule, then a Broadcast TWT Traffic Info field is present in the Broadcast TWT Parameter Set. FIG. 18 illustrates such an example of a Broadcast TWT Parameter Set that includes a Broadcast TWT Traffic Info field 1802.

Figure 19:
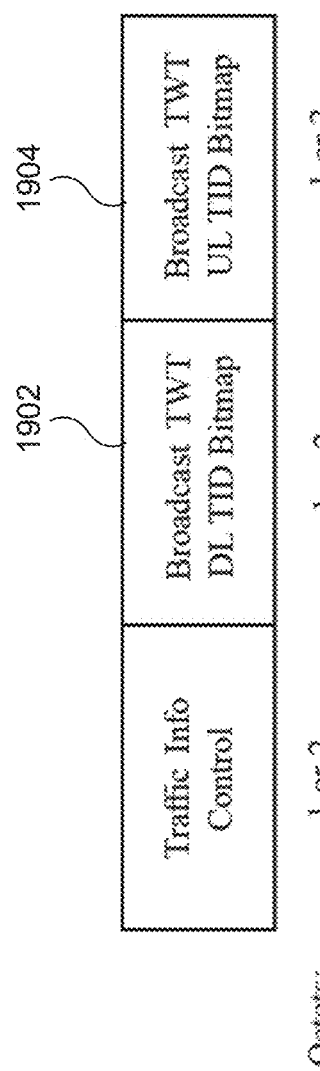
FIG. 19 illustrates an example Broadcast TWT Traffic Info field format in a Broadcast TWT Parameter Set according to embodiments of the present disclosure.

FIG. 19 illustrates an example Broadcast TWT Traffic Info field format in a Broadcast TWT Parameter Set. This is an example format of the Broadcast TWT Traffic Info field 1802. The Broadcast DL TID Bitmap subfield 1902 and Broadcast UL TID Bitmap subfield 1904 indicate the TIDs that are identified by the TWT scheduling AP or TWT scheduled STA as the latency sensitive traffic streams in the downlink and uplink direction, respectively. In each of the Broadcast TWT DL and UL TID Bitmaps, a value of 1 in the position k indicates that the $k^{th}$ TID is identified as a latency-sensitive traffic stream. Otherwise, it is not identified as a latency-sensitive traffic stream In order to provide additional protection to restricted TWT SPs, a restricted TWT scheduling AP or AP MLD may announce a Quiet interval by including Quiet elements in the management frame that it transmits that overlaps with restricted TWT SPs. If the non-AP STA or non-AP MLD supports restricted TWT operation, then the non-AP STA or non-AP MLD ensures that its TXOP ends before the start of the Quiet interval, and that it does not transmit during the Quiet interval unless it is a restricted TWT scheduled STA or restricted TWT scheduled non-AP MLD for that restricted TWT SP (i.e., it is a member of the restricted TWT schedule to which the Quiet interval applies).

According to one embodiment, the Quiet element as defined in IEEE 802.11-2020 can be used to create a Quiet interval in order to protect restricted TWT SPs for the members of the restricted TWT schedule. According to other embodiments, a variant of the Quiet element can be used in order to protect restricted TWT SP for the members of restricted TWT schedule.

Figure 20:
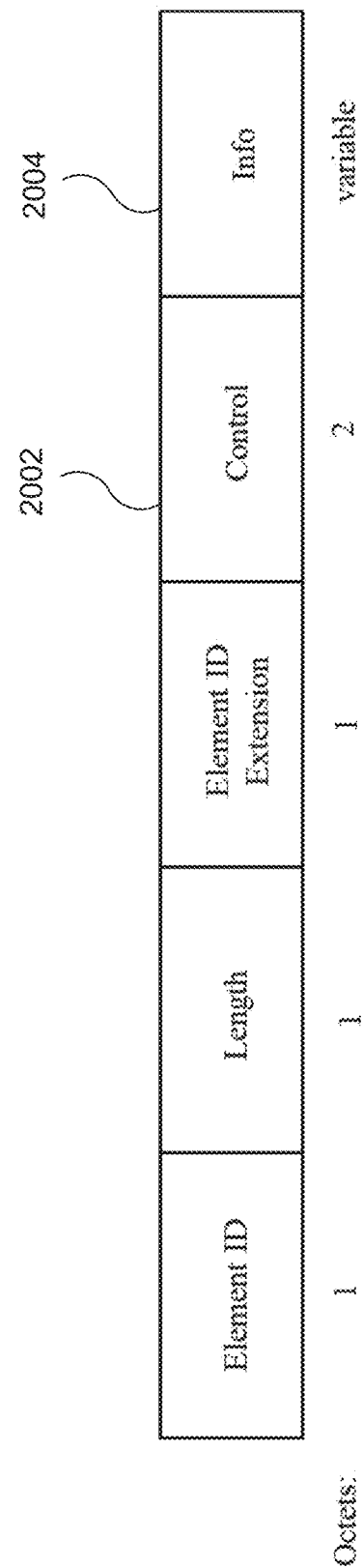
FIG. 20 illustrates an example format for a variant Quiet element according to various embodiments of the present disclosure.
Figure 21:
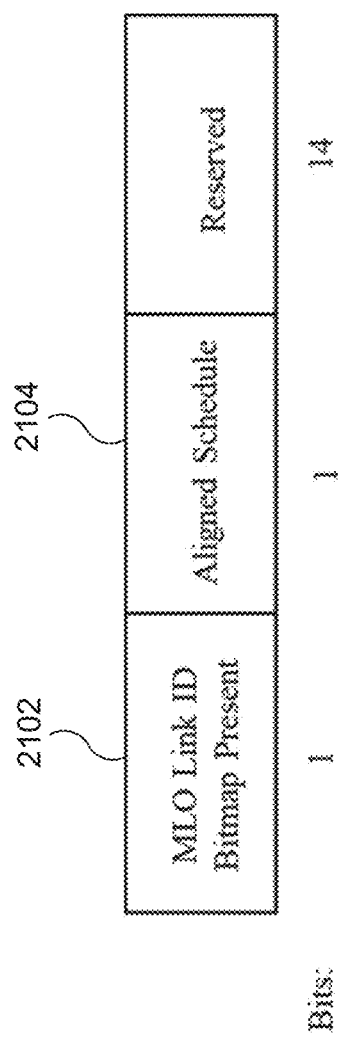
FIG. 21 illustrates an example format of the Control field of the variant Quiet element according to embodiments of the present disclosure.

FIG. 20 illustrates an example format for this variant Quiet element according to various embodiments of the present disclosure. An example format of the Control field 2002 of the variant Quiet element is illustrated in FIG. 21. If the MLO Link ID Bitmap Present subfield 2102 is set to 1 it would indicate that an MLO Link ID Bitmap subfield is present in the Info field 2004 of the variant Quiet element. Otherwise, the MLO Link ID Bitmap is not present in the variant Quiet element. If the Aligned Schedule subfield 2104 is set to 1, it would indicate that the variant Quiet element is for protection of a Restricted TWT Aligned Schedule.

Figure 22:
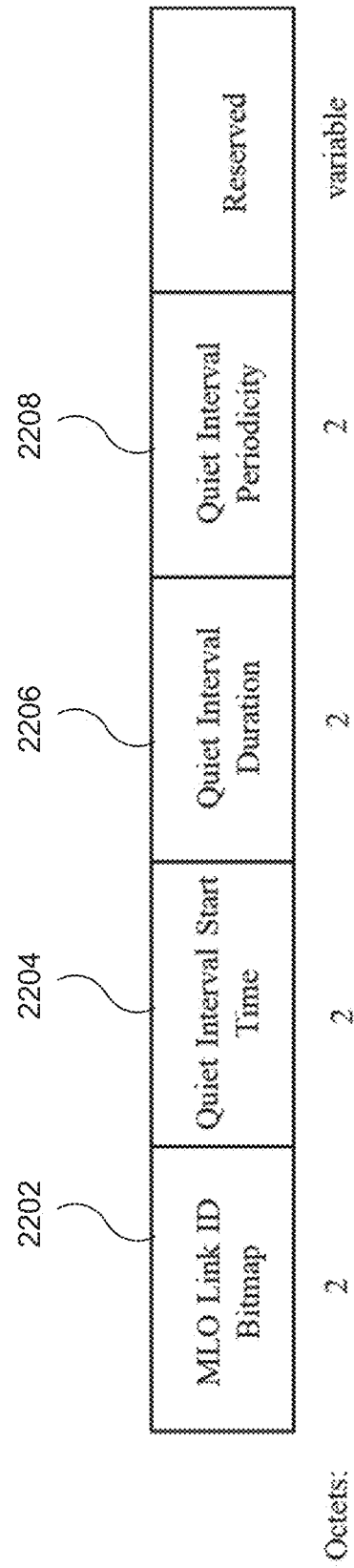
FIG. 22 illustrates an example format of the Info field in the variant Quiet element according to embodiments of the present disclosure.

FIG. 22 illustrates an example format of the Info field 2004 in the variant Quiet element of FIG. 20. The MLO Link ID Bitmap subfield 2202 includes a bitmap that indicates the links between the AP MLD and non-AP MLD for which the Quiet interval is applicable. If the $k^{th}$ bit in the bitmap is set to 1, it indicates that the Quiet interval is applicable to the $k^{th}$ link. Otherwise the Quiet interval is not applicable to the $k^{th}$ link. The Quiet Interval Start Time subfield 2204 specifies the start time of the Quiet interval. The Quiet Interval Duration subfield 2206 specifies the Quiet interval duration. The Quiet Interval Periodicity subfield 2208 specifies the periodicity of the Quiet interval.

FIG. 23 illustrates an example Control field format of a TWT element according to various embodiments of the present disclosure. For broadcast TWT operation between an AP MLD and a non-AP MLD, an MLO Enabled bit 2302 may be present in the Control field of the Broadcast TWT element that is sent over the negotiating link either from the AP MLD (Accept TWT, Alternate TWT, or Dictate TWT) or from the non-AP MLD (Request TWT, Suggest TWT, or Demand TWT), and can be used to indicate that broadcast TWT schedules corresponding to all Broadcast TWT Parameter Sets present in that Broadcast TWT element are applicable to the enabled links between the AP MLD and the non-AP MLD. If the MLO Enabled bit is 1, then all schedules are applicable to all enabled links. If the MLO Enabled bit is 0, then the schedules are not applicable to all enabled links.

For Individual TWT operation, however, there is only one TWT Parameter Set present in the TWT element. For Individual TWT operation for MLDs, the presence of the MLO Enabled bit 2302 may be interpreted as an indication of whether or not a TWT negotiation corresponding to the TWT Parameter Set is applicable to all enabled links between the AP MLD and the non-AP MLD. If the bit is 1, then a TWT agreement resulting from the negotiation is applicable to all enabled links. If the bit is 0, then the TWT agreement is not applicable to all enabled links.

In other embodiments, the above-mentioned functionalities of the MLO Enabled bit 2302 may be achieved using different bits for individual TWT and broadcast TWT operations. FIG. 24 illustrates an example Control field format of a TWT element with separate Individual and Broadcast TWT Enabled bits according to various embodiments of the present disclosure.

In the example of FIG. 24, for Individual TWT operation, an Individual TWT MLO Enabled bit 2402 may be present, and can be used to indicate whether or not a TWT negotiation corresponding to the TWT Parameter Set is applicable to all enabled links between the AP MLD and the non-AP MLD. If the Individual TWT MLO Enabled bit 2402 is 1, then a TWT agreement resulting from the negotiation is applicable to all enabled links. If the Individual TWT MLO Enabled bit 2402 is 0, then the TWT agreement is not applicable to all enabled links.

For broadcast TWT operation, the Individual TWT MLO Enabled subfield 2402 is not present. Instead, for broadcast TWT operation a Broadcast TWT MLO Enabled bit 2404 may be present, and can be used to indicate whether or not the Broadcast TWT schedules corresponding to all Broadcast TWT Parameter Sets present in that TWT element are applicable to all enabled links between the AP MLD and the non-AP MLD. If the Broadcast TWT MLO Enabled bit 2404 is 1, then all TWT schedules are applicable to all enabled links. If the Broadcast TWT MLO Enabled bit 2404 is 0, then TWT schedules are not applicable to all enabled links. For Individual TWT operation, the Broadcast TWT MLO Enabled subfield is not present.

In the embodiments of FIGS. 23 and 24, either the AP MLD or the non-AP MLD can make this indication through the Broadcast TWT Parameter Set in the corresponding Broadcast TWT element. For example, the AP MLD may indicate it with an Accept TWT, Alternate TWT, or Dictate TWT, and the non-AP MLD may indicate it with a Request TWT, Suggest TWT, or Demand TWT.

As discussed above, in some embodiments for multi-link operation, the broadcast TWT negotiating link between the AP MLD and the non-AP MLD may also set up the broadcast TWT schedules for other links between the AP MLD and the non-AP MLD. This functionality can be helpful in situations where the other links do not have any Beacon frame or any other frame that contains TWT elements.

In this scenario, any Broadcast TWT Parameter Set may be applicable to any subset of links between the AP MLD and the non-AP MLD. In this case, the MLO Enabled bit in the Control field shall be set to 0, and as illustrated in the example Broadcast TWT Parameter Set field format of FIG. 15, a Broadcast TWT Link ID Bitmap 1502 in the Broadcast TWT Parameter Set may indicate the links for which the schedule corresponding to the Broadcast TWT Parameter Set is applicable. If the bit corresponding to a link in the Broadcast TWT Link ID Bitmap is 1, then the broadcast TWT schedule is applicable to that link. If the bit corresponding to the link in the Broadcast TWT Link ID Bitmap is 0, then the broadcast TWT schedule is not applicable to that link.

In this embodiment, either the AP MLD or the non-AP MLD can indicate this Broadcast TWT Link ID Bitmap through the Broadcast TWT Parameter Set in the corresponding Broadcast TWT element. For example, the AP MLD may indicate it with an Accept TWT, Alternate TWT, or Dictate TWT, and the non-AP MLD may indicate it with a Request TWT, Suggest TWT, or Demand TWT.

In other embodiments, each link between the AP MLD and the non-AP MLD may have its own Broadcast TWT element contained in a Beacon frame, Association Response frame, or Re-Association Response frame, and the broadcast TWT schedules on that link follow the Broadcast TWT Parameter Set included in the Broadcast TWT element sent over that link—either from the AP MLD (with Accept TWT, Alternate TWT, or Dictate TWT) or from the non-AP MLD (with Request TWT, Suggest TWT, or Demand TWT)—regardless of any other indication made through the presence of the MLO Enabled subfield, Broadcast TWT MLO Enabled subfield, or Broadcast TWT Link ID Bitmap field. If either the STA or AP does not support multi-link operation or if the AP or the STA is not affiliated with any multi-link device, then the Broadcast TWT Parameter Set in the TWT element transmitted by either the AP or the STA does not contain a Broadcast TWT Link ID Bitmap field.

If any Broadcast TWT Parameter Set corresponds to an Aligned Schedule, the TWT Wake Time and the Broadcast TWT Persistence parameter for other links follows that of the negotiation link. For Aligned Schedules, the non-AP STAs on other links shall wake up at the same time the non-AP STA on the negotiating link wakes up regardless of the timing synchronization function (TSF) timer values in the other links. Furthermore, if the Broadcast TWT Parameter Set corresponds to an Aligned Schedule, the evolution of a Broadcast TWT Persistence Parameter subfield on the other links follows the evolution on the negotiating link.

Figure 25:
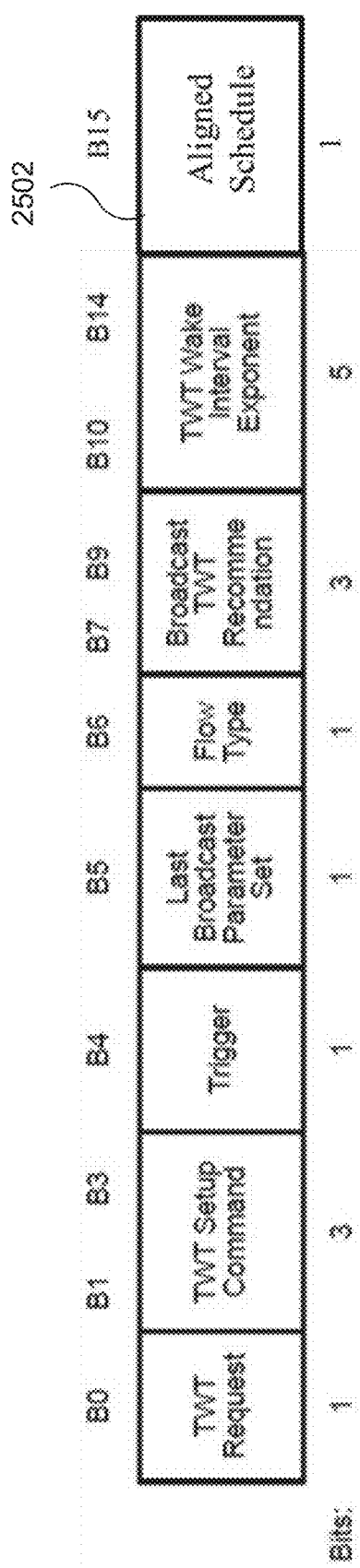
FIG. 25 illustrates an example of a Request Type field format in a Broadcast TWT Parameter Set field according to various embodiments of the present disclosure.

FIG. 25 illustrates an example of a Request Type field format in a Broadcast TWT Parameter Set field according to various embodiments of the present disclosure. Whether or not a schedule corresponding to a Broadcast TWT Parameter Set is an Aligned Schedule can be indicated by the Aligned Schedule subfield 2502 in the Request Type field in a Broadcast TWT Parameter Set field, as illustrated in the example Request Type field format of FIG. 25. For multi-link devices, if the bit corresponding to the Aligned Schedule subfield 2502 is 1, then the schedule corresponding to the Broadcast TWT Parameter Set is an Aligned Schedule. If the bit corresponding to the Aligned Schedule subfield 2502 is 0, then the schedule corresponding to the Broadcast TWT Parameter Set is not an Aligned Schedule. If the AP or the non-AP STA does not support Aligned Schedule, or if the AP or non-AP STA is not part of any multi-link devices, then the Aligned Schedule subfield 2502 in the Request Type field format in a Broadcast TWT Parameter Set field shall not be present.

In such embodiments, either the AP MLD or the non-AP MLD can indicate an Aligned Schedule through the Broadcast TWT Parameter Set in the corresponding Broadcast TWT element. For example, the AP MLD may indicate it with an Accept TWT, Alternate TWT, or Dictate TWT, and the non-AP MLD may indicate it with a Request TWT, Suggest TWT, or Demand TWT.

Figure 26:
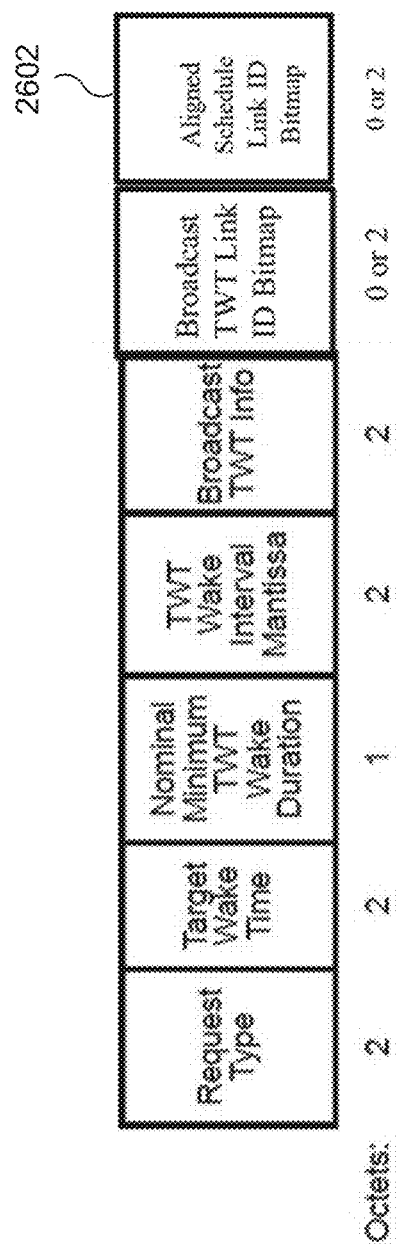
FIG. 26 illustrates another example of a Broadcast TWT Parameter Set field format according to various embodiments of the present disclosure.

FIG. 26 illustrates another example of a Broadcast TWT Parameter Set field format according to various embodiments of the present disclosure. In some embodiments, whether or not an Aligned Schedule is applicable for more than one link between the AP MLD and the non-AP MLD can be indicated by the presence of an Aligned Schedule Link ID Bitmap field 2602 in the Broadcast TWT Parameter Set, as illustrated in the example Broadcast TWT Parameter Set field format of FIG. 26. If a bit corresponding to a link in the Aligned Schedule Link ID Bitmap is 1, the Aligned Schedule is applicable to that link. If the bit corresponding to the link in the Aligned Schedule Link ID Bitmap is 0, then the Aligned Schedule is not applicable to that link. If either the AP or STA doesn't support multi-link operation or is not affiliated with any multi-link device, then the Aligned Schedule Link ID Bitmap field 2602 in the Broadcast TWT Parameter Set may not be present.

In such embodiments, either the AP MLD or the non-AP MLD can indicate an Aligned Schedule Link ID Bitmap through the Broadcast TWT Parameter Set in the corresponding Broadcast TWT element. For example, the AP MLD may indicate it with an Accept TWT, Alternate TWT, or Dictate TWT, and the non-AP MLD may indicate it with a Request TWT, Suggest TWT, or Demand TWT.

Figure 27:
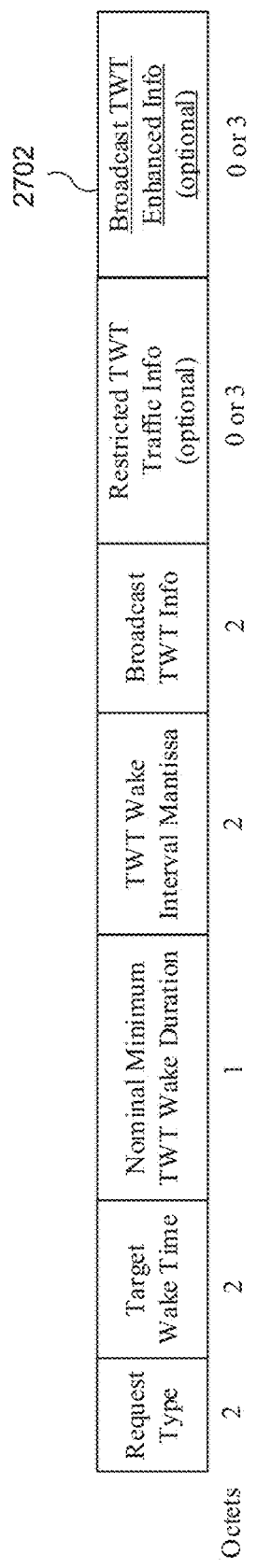
FIG. 27 illustrates an example format of the Broadcast TWT Parameter Set field in a broadcast TWT element according to various embodiments of the present disclosure.

According to one embodiment, the format of the Broadcast TWT Parameter Set field in a broadcast TWT element can be the example format illustrated in FIG. 27. The Broadcast TWT Enhanced Info subfield 2702, if present, specifies additional information about the broadcast TWT schedule. The format of the Broadcast TWT Enhanced Info subfield 2702 is illustrated in FIG. 28.

Figure 28:
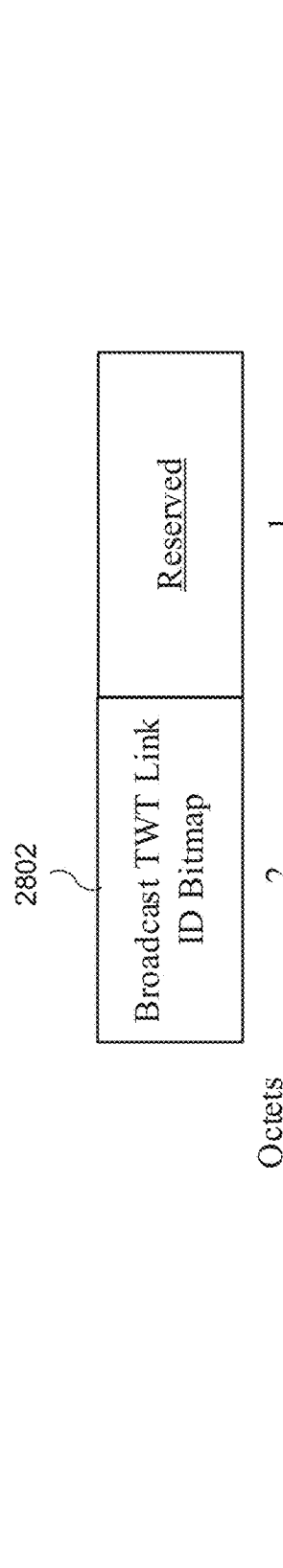
FIG. 28 illustrates an example of the format of the Broadcast TWT Enhanced Info subfield according to various embodiments of the present disclosure.

According to one embodiment, in the example of FIG. 28, the Broadcast TWT Link ID Bitmap subfield 2802 specifies a bitmap indicating the links between an AP MLD and a non-AP MLD for which the corresponding broadcast TWT schedule is being negotiated. A value of 1 in the $k^{th}$ bit position in the Broadcast TWT Link ID Bitmap subfield 2802 indicates that the negotiation for the TWT schedule applies for the $k^{th}$ link between the AP MLD and non-AP MLD. A value set to 0 in the $k^{th}$ bit position in the Broadcast TWT Link ID Bitmap subfield 2802 indicates that the negotiation for the TWT schedule does not apply for the $k^{th}$ link between the AP MLD and non-AP MLD.

Figure 29:
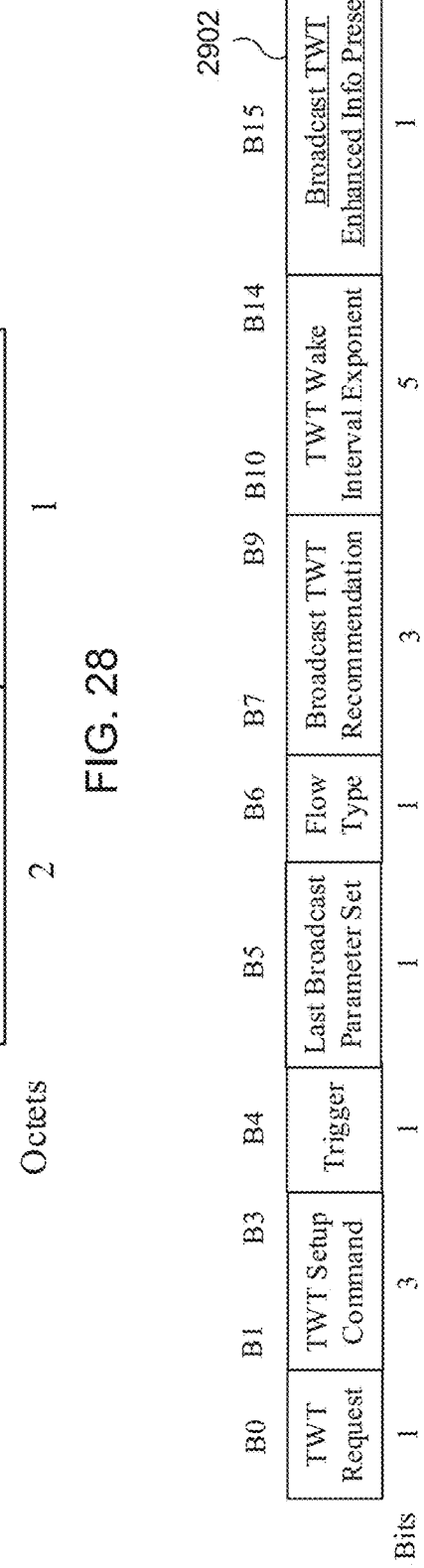
FIG. 29 illustrates an example of the Request Type field format in a Broadcast TWT Parameter Set field according to various embodiments of the present disclosure.

According to one embodiment, the Request Type field format in a Broadcast TWT Parameter Set field is illustrated in FIG. 29. The Broadcast TWT Enhanced Info Present subfield 2902 in FIG. 29 indicates whether or not a Broadcast TWT Enhanced Info subfield is present in the corresponding Broadcast TWT Parameter Set field. The Broadcast TWT Enhanced Info Present subfield 2902 is set to 1 if Broadcast TWT Enhanced Info subfield is present in the corresponding Broadcast TWT Parameter Set field. Otherwise, it is set to 0. This subfield is set to 0 when the corresponding Broadcast TWT Parameter Set field is carried in a TWT element with Negotiation Type subfield set to 2.

According to one embodiment, a TWT scheduling AP affiliated with an AP MLD and a TWT scheduled STA affiliated with a non-AP MLD, for negotiating membership of a broadcast TWT schedule, shall follow the rules defined for broadcast TWT operation and the following additional rules:

The TWT scheduled STA affiliated with the non-AP MLD or the TWT scheduling AP affiliated with the AP MLD, while negotiating for a broadcast TWT schedule, may indicate the link or links between the AP MLD and the non-AP MLD for which the negotiation is being conducted. The TWT scheduled STA or the TWT scheduling AP transmitting the TWT element may make the link indication in the Broadcast TWT Link ID Bitmap subfield in the Broadcast TWT Parameter Set corresponding to the broadcast TWT schedule.

If one or more links are indicated in the Broadcast TWT Link ID Bitmap subfield in the Broadcast TWT Parameter Set transmitted by the TWT scheduled STA affiliated with the non-AP MLD or the TWT scheduling AP affiliated with the AP MLD, the corresponding broadcast TWT schedule is negotiated on behalf of the STAs affiliated with the same MLD and operating on the indicated links between the AP MLD and the non-AP MLD. The Target Wake Time field in the Broadcast TWT Parameter Set field shall be in reference to the TSF time of the respective links that are indicated in the Broadcast TWT Link ID Bitmap.

A TWT scheduling AP affiliated with an AP MLD that receives a TWT element with Broadcast TWT Link ID Bitmap subfield in a Broadcast TWT Parameter Set from a TWT scheduled STA affiliated with a non-AP MLD may respond by including a Broadcast TWT Link ID Bitmap subfield that indicates the same or different set of links as that of the received Broadcast TWT Link ID Bitmap if the TWT Setup Command field in the Request Type field in the corresponding Broadcast TWT Parameter Set in the response frame is set to Alternate TWT or Dictate TWT. The TWT scheduling AP shall respond with a Broadcast TWT Link ID Bitmap that indicates the same set of links and the same TWT parameters as that indicated in the received Broadcast TWT Parameter Set if the TWT Setup Command field in the Request Type field in the corresponding Broadcast TWT Parameter Set in the response frame is set to Accept TWT or Reject TWT.

According to one embodiment, if a TWT scheduling AP affiliated with an AP MLD or a TWT scheduled STA affiliated with a non-AP MLD transmits a broadcast TWT element that contains a Broadcast TWT Link ID Bitmap subfield in at least one of the Broadcast TWT Parameter Set fields, then the TWT scheduling AP or the TWT scheduled STA shall set the Link ID Bitmap Present subfield in the Control field of the broadcast TWT element to 1. Otherwise, the TWT scheduling AP or the TWT scheduled STA shall set the Link ID Bitmap Present subfield to 0.

According to various embodiments of the present disclosure, for restricted TWT operation between an AP MLD and a non-AP MLD, the AP MLD or the non-AP MLD should not transmit a TWT element over any of the links between them that sets the $k^{th}$ bit in the Restricted TWT DL TID Bitmap subfield or Restricted TWT UL TID Bitmap subfield, if present, to 1 if the TID k is not mapped, through TID-to-Link mapping, on the desired link for which the restricted TWT schedule is being negotiated. Moreover, the AP MLD or the non-AP MLD shall not transmit a TWT element over any of the links between them that sets the DL TID Bitmap Valid subfield or UL TID Bitmap Valid subfield, if present, to 1 if any of the TIDs is not mapped on the desired link.

According to one embodiment, for restricted TWT operation between an AP MLD and a non-AP MLD, an AP affiliated with the AP MLD shall ensure that a TID k is mapped on the desired link before the AP affiliated with the AP MLD transmits a TWT element over any of the links between them that sets the k-th bit in the Restricted TWT DL TID Bitmap subfield or Restricted TWT UL TID Bitmap subfield, if present, to 1 for the desired link for which the restricted TWT schedule is being negotiated. In some embodiments, the desired link for which the restricted TWT schedule is being negotiated may be a different link than the link over which the negotiation occurs (i.e., the link over which the TWT element is sent to suggest or request the restricted TWT schedule).

According to another embodiment, for restricted TWT operation between an AP MLD and a non-AP MLD, if an AP affiliated with the AP MLD receives from a non-AP STA affiliated with the non-AP MLD a TWT element requesting to set up a TWT schedule (in particular, a restricted TWT schedule) over any link n between the AP MLD and the non-AP MLD for a particular TID k, and if that TID k has not been mapped on that link, then the AP MLD also deems the TWT request as an implicit request for TID-to-Link mapping requesting the AP MLD to map TID k on link n. The AP MLD performs the necessary TID-to-Link mapping to map TID k on link n before the AP MLD accepts the TWT request.

According to another embodiment, for restricted TWT operation between an AP MLD and a non-AP MLD, if a restricted TWT schedule is set up over a link between the AP MLD and the non-AP MLD, and if during the restricted TWT SP corresponding to the restricted TWT schedule the channel is busy and either the AP affiliated with the AP MLD or the non-AP STA affiliated with the non-AP MLD cannot transmit the MAC Service Data Units (MSDUs) of latency-sensitive TIDs (i.e., the TIDs that are negotiated for the restricted TWT schedule) over that link, then the AP affiliated with the AP MLD or the non-AP STA affiliated with the non-AP MLD can transmit the MSDUs corresponding to that TID over another link between the same AP MLD and the non-AP MLD if that TID is also mapped on the other link through TID-to-Link mapping.

As discussed herein above, due to constraints introduced by data transmission rules for NSTR non-AP MLDs, latency-sensitive applications at the client side can be disrupted by restricted TWT operation when a restricted TWT schedule is established on a link that is a part of an NSTR link pair. In particular, this can occur in the case in which PPDUs transmitted during a restricted TWT SP need to be aligned with PPDUs transmitted on other links due to NSTR constraints.

Although a non-AP STA affiliated with a non-AP MLD may establish one or more restricted TWT schedules over one or more links between the AP MLD and the non-AP MLD, embodiments discussed below consider the scenario in which a non-AP MLD establishes one or more restricted TWT schedules over a single link between the AP MLD and the non-AP MLD.

Figure 30:
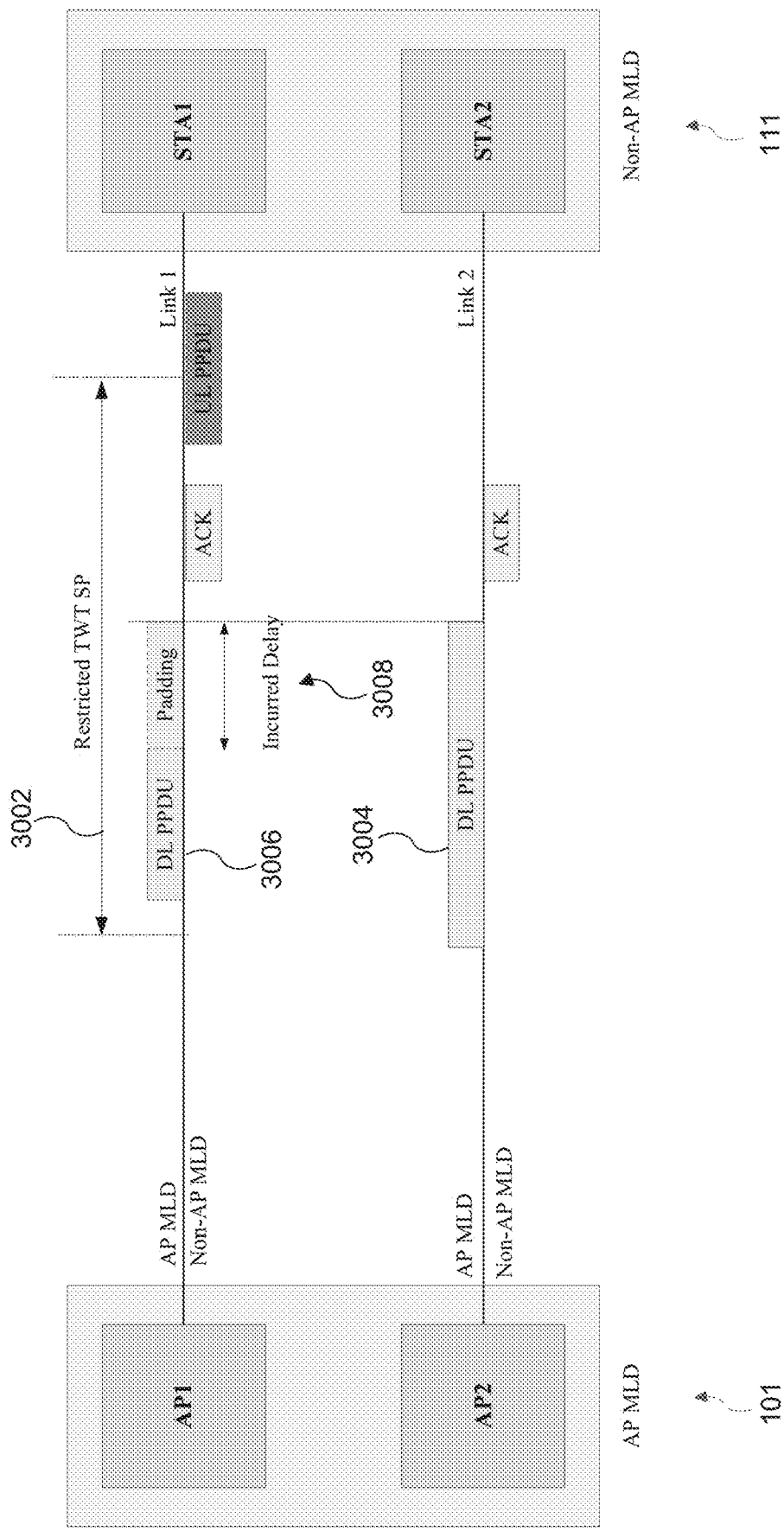
FIG. 30 illustrates an example of disruption to restricted TWT operation under NSTR constraints according to various embodiments of the present disclosure.

FIG. 30 illustrates an example of disruption to restricted TWT operation under NSTR constraints according to various embodiments of the present disclosure. As illustrated in FIGS. 30, AP1 and AP2 are two APs affiliated with the AP MLD 101, while STA1 and STA2 are two non-AP STAs affiliated with the non-AP MLD 111. Two links are set up between the AP MLD and the non-AP MLD—Link 1 between AP1 and STA1, and Link 2 between AP2 and STA2. The non-AP MLD is an NSTR non-AP MLD, i.e., Link 1 and Link 2 form an NSTR link pair. Both Link 1 and Link 2 are enabled links.

A restricted TWT schedule is established on Link 1, with corresponding restricted TWT SP 3002. AP2 transmits a DL PPDU 3004 for STA2 on Link 2 before the restricted TWT SP starts on Link 1. During the restricted TWT SP on Link 1, AP1 transmits a DL PPDU 3006 to STA1. The DL PPDU 3006 transmission during the restricted TWT SP on Link 1 finishes earlier than the end time of the DL PPDU 3004 transmitted on Link 2. In this situation, in order to avoid self-interference at the non-AP MLD, according to the current 802.11be specification, AP1 will align the end time of DL PPDU 3006 on Link 1 with the end time of the DL PPDU 3004 on Link 2 (in this illustration, the alignment is performed by appending extra padding to the DL PPDU 3006 transmitted on Link 1). However, this alignment incurs delay (e.g., incurred delay 3008) in subsequent frame transmissions during the remainder of the restricted TWT SP 3002 on Link 1. This added delay negatively impacts the latency-sensitive applications for the non-AP MLD, and hence is not desirable.

For a scenario in which a restricted TWT schedule, which is not a trigger-enabled TWT, is established on a link between an AP MLD and a non-AP MLD that forms part of an NSTR link pair between the AP MLD and non-AP MLD, while a UL PPDU is being transmitted during the restricted TWT SP on that link, if a DL PPDU is transmitted on another link that forms the NSTR link pair with the first link, then the overlapped portions of the UL PPDU and the DL PPDU will suffer from interference due to NSTR constraints. This may affect the latency-sensitive traffic flow during the restricted TWT SP.

Figure 31:
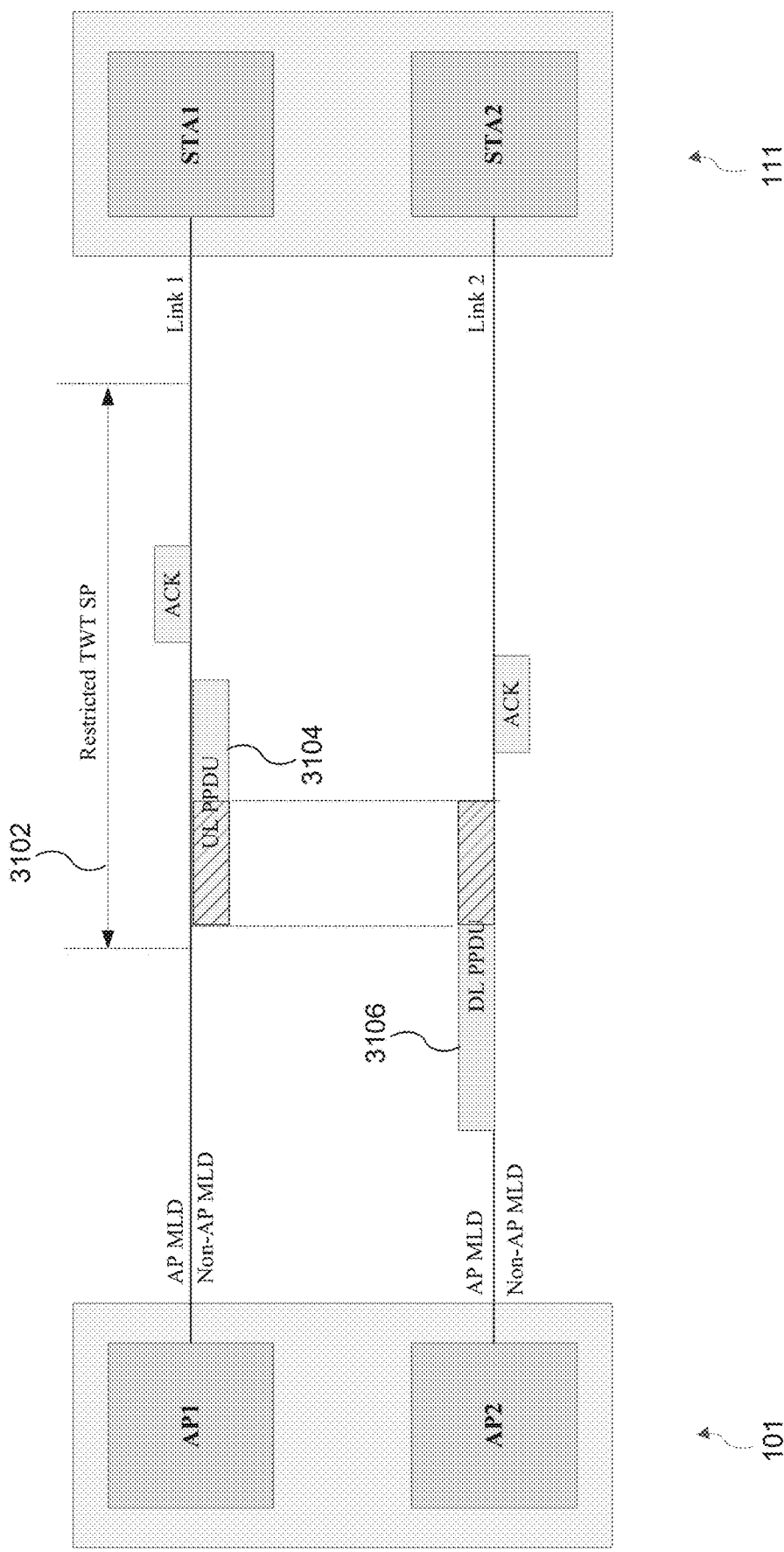
FIG. 31 illustrates another example of disruption to restricted TWT operation under NSTR constraints according to various embodiments of the present disclosure.

FIG. 31 illustrates an example of this type of disruption to restricted TWT operation under NSTR constraints. Similar to FIGS. 30, AP1 and AP2 are two APs affiliated with the AP MLD 101, while STA1 and STA2 are two non-AP STAs affiliated with the non-AP MLD 111. Two links are set up between the AP MLD and the non-AP MLD—Link 1 between AP1 and STA1, and Link 2 between AP2 and STA2. The non-AP MLD is an NSTR non-AP MLD, i.e., Link 1 and Link 2 form an NSTR link pair. Both Link 1 and Link 2 are enabled links.

A restricted TWT schedule, which is not a trigger-enabled TWT schedule, is established on Link 1, with corresponding restricted TWT SP 3102. Since this is not a trigger-enabled TWT, the AP MLD does not know beforehand at what time during the restricted TWT SP on Link 1 the STA operating on Link 1 (STA1) will transmit the UL PPDU 3104. When AP2 transmits a DL PPDU 3106 to STA2 on Link 2, this transmission starts before the restricted TWT SP starts on Link 1, and overlaps in time with the restricted TWT SP duration on Link 1. During the restricted TWT SP, STA1 transmits UL PPDU 3104 on Link 1 that overlaps in time with the DL PPDU 3106 transmitted on Link 2. This overlap causes NSTR interference, which essentially disrupts latency-sensitive traffic flow for STA1.

Various embodiments are provided below for avoiding interference stemming from NSTR constraints during a restricted TWT SP. For the scenario in which a restricted TWT schedule, which is not a trigger-enabled TWT, is established on a first link between an AP MLD and a non-AP MLD that forms an NSTR link pair with a second link between the AP MLD and the non-AP MLD, in order to avoid the interference stemming from NSTR constraints during the restricted TWT SP on the first link, the AP MLD may end transmission of any downlink frames on the second link before the restricted TWT SP starts on the first link. Such embodiments can also be applied when the restricted TWT schedule established on the first link is trigger-enabled.

In such embodiments, the necessary period of time between the end of frame transmission on the second link and the start of the restricted TWT SP on the first link can vary. In some embodiments, if the frame transmitted on the second link solicits an immediate response, then the transmission of that frame on the second link ends at least aSIFSTime duration before the restricted TWT SP starts on the first link. In other embodiments in which the frame transmitted on the second link solicits an immediate response, the transmission of that frame on the second link ends at least (aSIFSTime+margin1) duration before the restricted TWT SP starts on the first link, where the margin1 is measured in µs, and can be fraction or multiple of aSIFSTime duration. For example, margin1 can be 8 µs. This is illustrated in FIG. 32.

Figure 32:
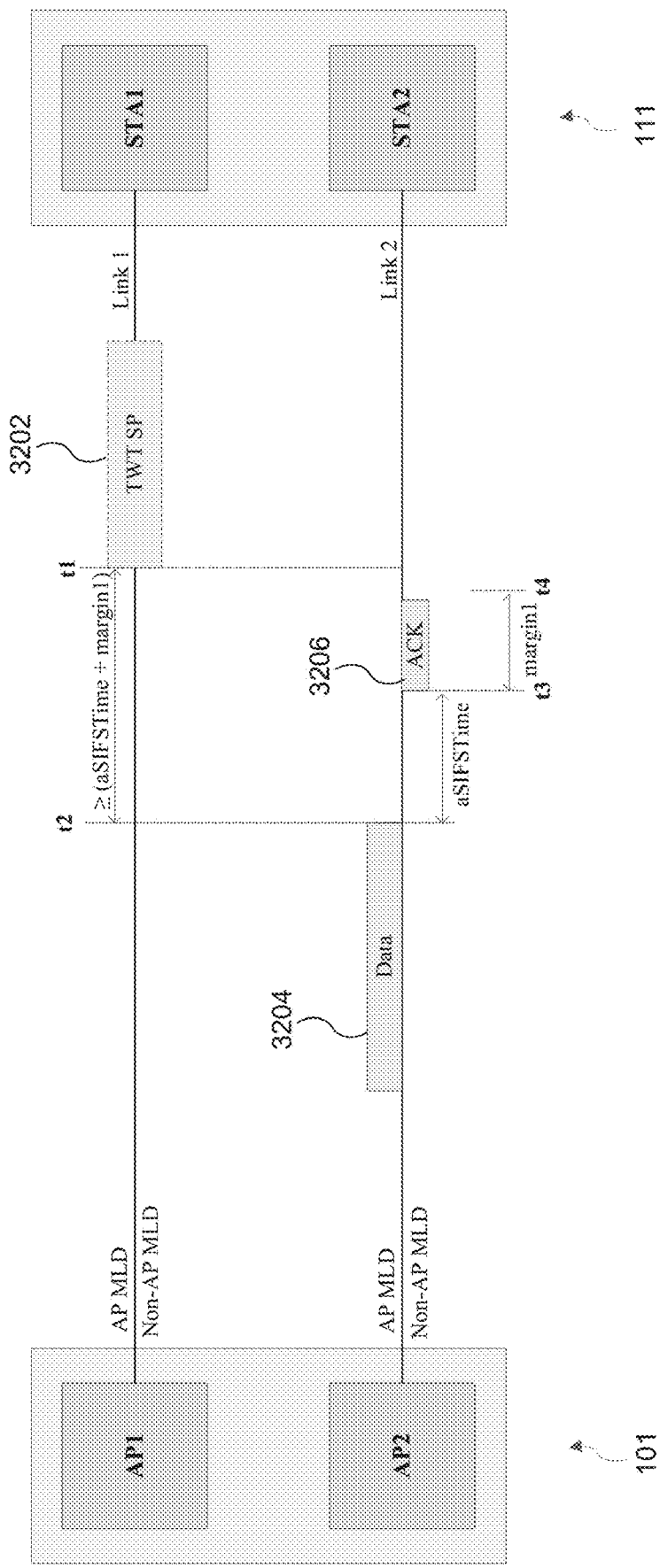
FIG. 32 illustrates an example of early termination of frame transmission on an NSTR link pair in order to avoid overlapping with a restricted TWT SP on the NSTR link pair according to various embodiments of the present disclosure.

FIG. 32 illustrates an example of early termination of frame transmission on an NSTR link pair in order to avoid overlapping with a restricted TWT SP on the NSTR link pair. Similar to FIGS. 30 and 31, AP1 and AP2 are two APs affiliated with the AP MLD 101, while STA1 and STA2 are two non-AP STAs affiliated with the non-AP MLD 111. Two links are set up between the AP MLD and the non-AP MLD—Link 1 (the first link) between AP1 and STA1, and Link 2 (the second link) between AP2 and STA2. The non-AP MLD is an NSTR non-AP MLD, i.e., Link 1 and Link 2 form an NSTR link pair. Both Link 1 and Link 2 are enabled links. A restricted TWT schedule, which is not a trigger-enabled TWT schedule, is established on Link 1, with corresponding restricted TWT SP 3202.

The restricted TWT SP 3202 starts on Link 1 at time instant t1. A DL data frame 3204 is transmitted on Link 2 and ends transmission at time instant t2, which is at least (aSIFSTime+margin1) duration before t1. After a duration of aSIFSTime, at time instant t3, an ACK 3206 is transmitted by STA2 on Link 2. Additionally, a duration of margin1 after t3 ends at time instant t4. The time difference (t1−t2) is greater than or equal to the duration (aSIFSTime+margin1).

Figure 33:
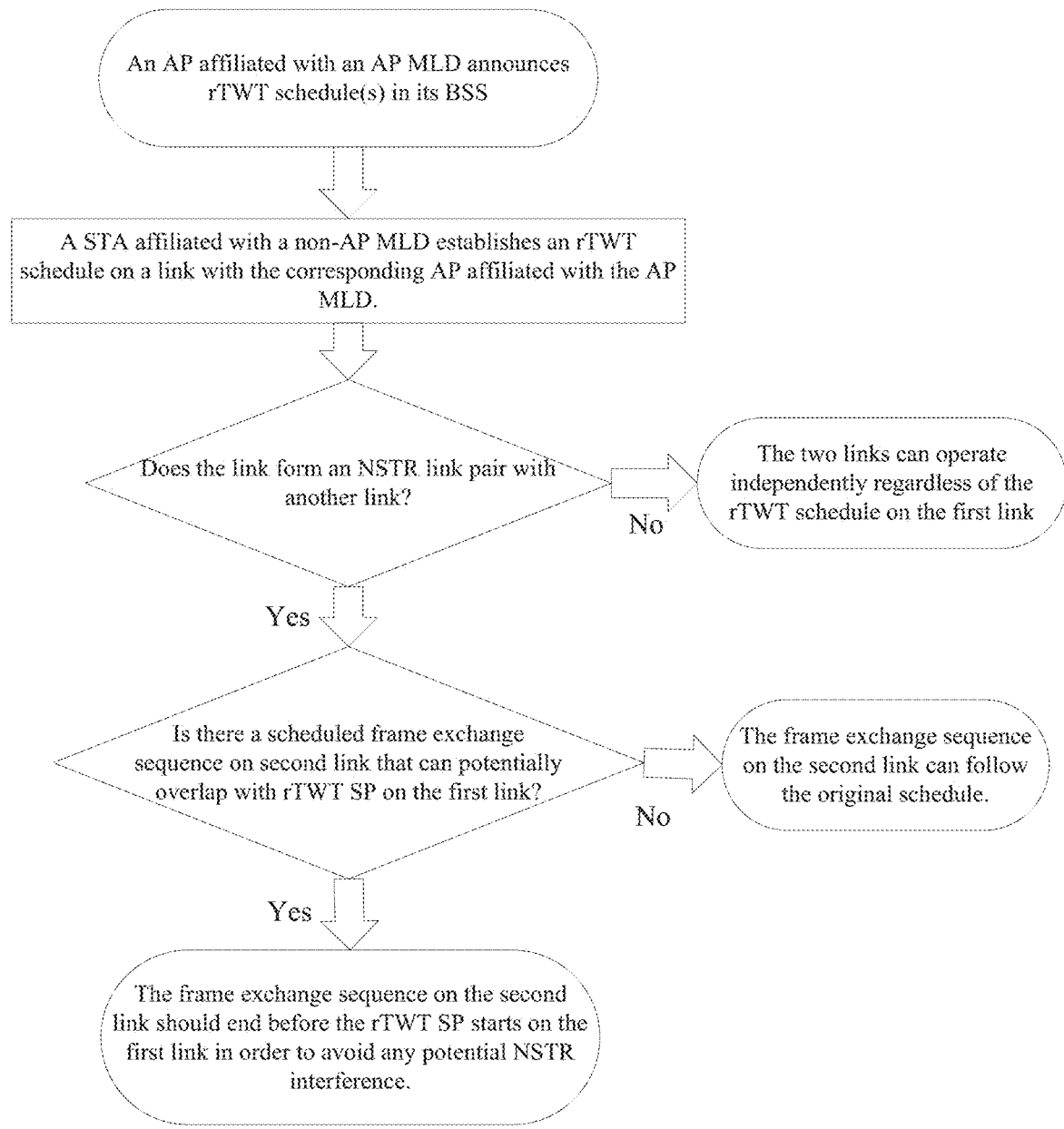
FIG. 33 illustrates an example process for early termination of frame transmission in order to avoid NSTR interference according to various embodiments of the present disclosure.

FIG. 33 illustrates an example process for early termination of frame transmission in order to avoid NSTR interference according to various embodiments of the present disclosure. The example process of FIG. 33 may include the procedures illustrated in, e.g., FIG. 32.

In various other embodiments for the scenario in which a restricted TWT schedule, which is not a trigger-enabled TWT, is established on a first link between an AP MLD and a non-AP MLD that forms an NSTR link pair with a second link between the AP MLD and the non-AP MLD, in order to avoid the interference stemming from NSTR constraints during the restricted TWT SP on the first link, the non-AP MLD may, before transmitting any uplink PPDU, send a short frame (e.g., a UL Transmission Notification frame) on the first link. This frame alerts the AP MLD about the upcoming UL transmission on the first link during the non-trigger-enabled restricted TWT SP, and accordingly the AP MLD can avoid transmitting any DL frame on the second link that would potentially overlap with the UL frame transmission on the first link.

In this case, according to one embodiment, the non-AP MLD would wait for an ACK for UL Transmission Notification frame sent by the AP MLD before the non-AP MLD starts UL PPDU transmission on the first link during the restricted TWT SP. According to another embodiment, upon sending the UL Transmission Notification frame on the first link, the non-AP MLD initiates a timer (e.g., a UL Transmission Wait Timeout timer) and sends the UL PPDU frames on the first link either after the non-AP MLD receives a corresponding ACK from the AP MLD or after the UL Transmission Wait Timeout timer expires—whichever happens first.

For the scenario in which a restricted TWT schedule, which is a trigger-enabled TWT, is established on a first link between an AP MLD and a non-AP MLD that forms an NSTR link pair with a second link between the AP MLD and the non-AP MLD, if the downlink PPDU transmission on the first link ends before an ongoing downlink PPDU transmission on the second link, then it is possible that an ACK for the DL PPDU on the first link is not received due to interference caused by NSTR constraints at the non-AP MLD. This would interrupt the latency-sensitive traffic flow during the restricted TWT SP on the first link. In order to avoid such interference, according to one embodiment, DL PPDU transmission on the second link is truncated such that the end time of the DL PPDU on the second link is aligned with the end time of the DL PPDU on the first link. This embodiment is illustrated in FIG. 34.

Figure 34:
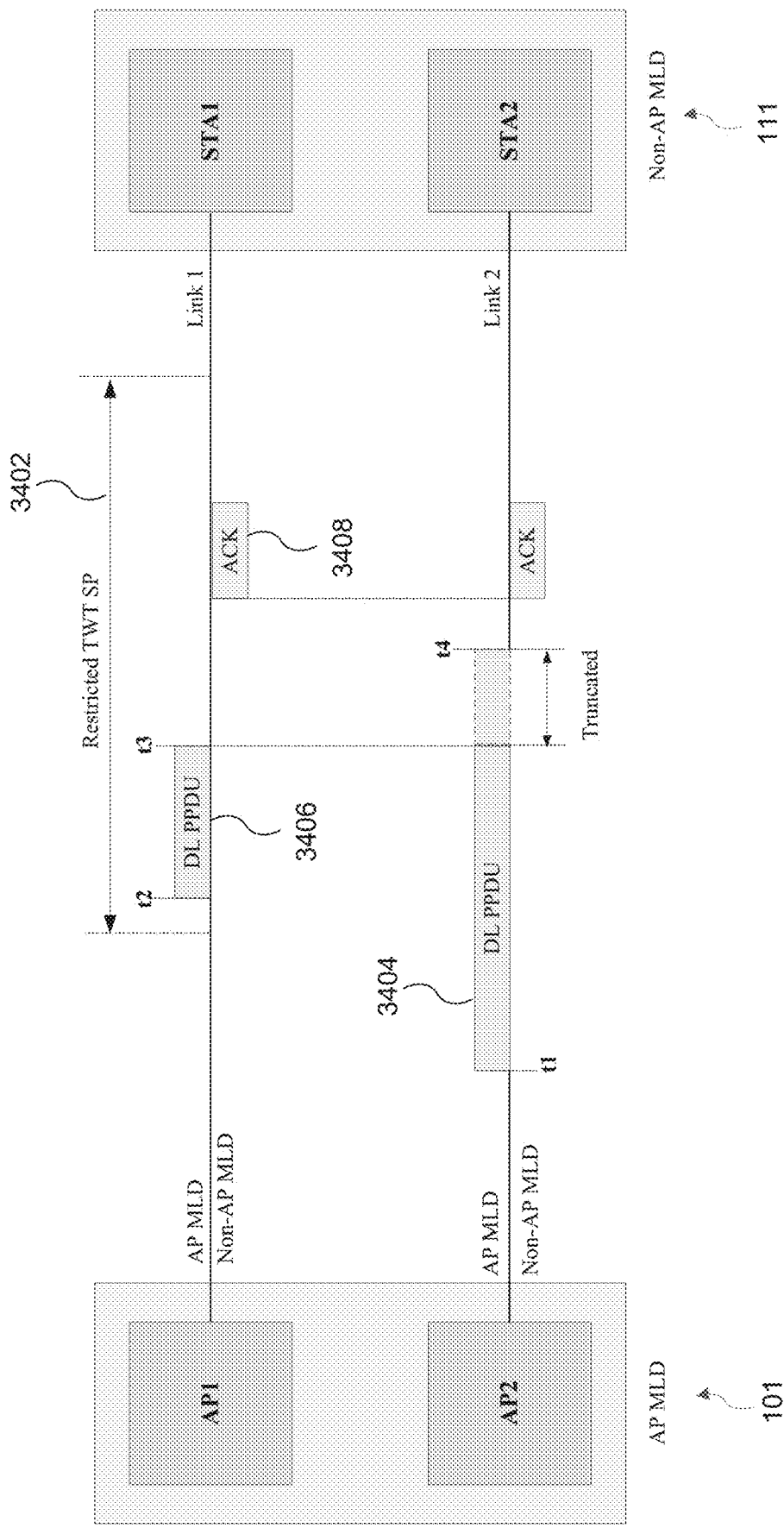
FIG. 34 illustrates an example of PPDU alignment through TXOP truncation according to various embodiments of the present disclosure.

FIG. 34 illustrates an example of PPDU alignment through TXOP truncation. Similar to FIGS. 30-32, AP1 and AP2 are two APs affiliated with the AP MLD 101, while STA1 and STA2 are two non-AP STAs affiliated with the non-AP MLD 111. Two links are set up between the AP MLD and the non-AP MLD—Link 1 (the first link) between AP1 and STA1, and Link 2 (the second link) between AP2 and STA2. The non-AP MLD is an NSTR non-AP MLD, i.e., Link 1 and Link 2 form an NSTR link pair. Both Link 1 and Link 2 are enabled links. A restricted TWT schedule, which is a trigger-enabled TWT schedule, is established on Link 1, with corresponding restricted TWT SP 3402.

A DL PPDU 3404 transmission starts on Link 2 at time instant t1, and is initially scheduled to end at time instant t4. The DL PPDU 3404 duration on Link 2 overlaps in time with restricted TWT SP 3402 on Link 1. During the trigger-enabled restricted TWT SP 3402 on Link 1, a DL PPDU 3406 starts at time instant t2 and is scheduled to end at time instant t3, where t3 occurs before t4. In order to avoid the subsequent ACK 3408 on Link 1 facing NSTR interference with the ongoing DL PPDU 3404 on Link 2, according to this embodiment, AP2 on Link 2 truncates the DL PPDU 3404 on Link 2 and aligns its end time with the end time of the DL PPDU 3406 on Link 1 during the restricted TWT SP 3402.

According to another embodiment, in order to avoid the NSTR interference situation described above, the AP MLD would not transmit, on the second link, a DL PPDU with a duration exceeding that of the DL PPDU on the first link, and would make sure the end time of the DL PPDU on the second link is aligned with the end time of the DL PPDU on the first link.

According to yet another embodiment, AP2 affiliated with the AP MLD can break the DL PPDU to be transmitted to STA2 affiliated with the non-AP MLD into multiple smaller PPDUs. The key conditions considered while making the breakdown are the NSTR constraint between Link 1 and Link 2 and the restricted TWT operation on Link 1. Furthermore, according to this embodiment, AP2 can start to transmit each of the smaller PPDUs and receive their acknowledgements until the start of the restricted TWT SP. Following the start of the restricted TWT SP, AP2 can continue to transmit the small PPDUs as long as an NSTR conflict does not arise with the transmissions of STA1. When an NSTR conflict scenario arises with the transmissions of STA1, AP2 can align its transmission to avoid this NSTR conflict scenario. Alternatively, AP2 can defer the transmission to STA2 and either remain idle or alternatively serve some other STA in that duration so that the NSTR conflict scenario is avoided. After the end of STA2's transmission, AP2 can continue to transmit to STA2 if no further NSTR conflict arises.

Figure 35:
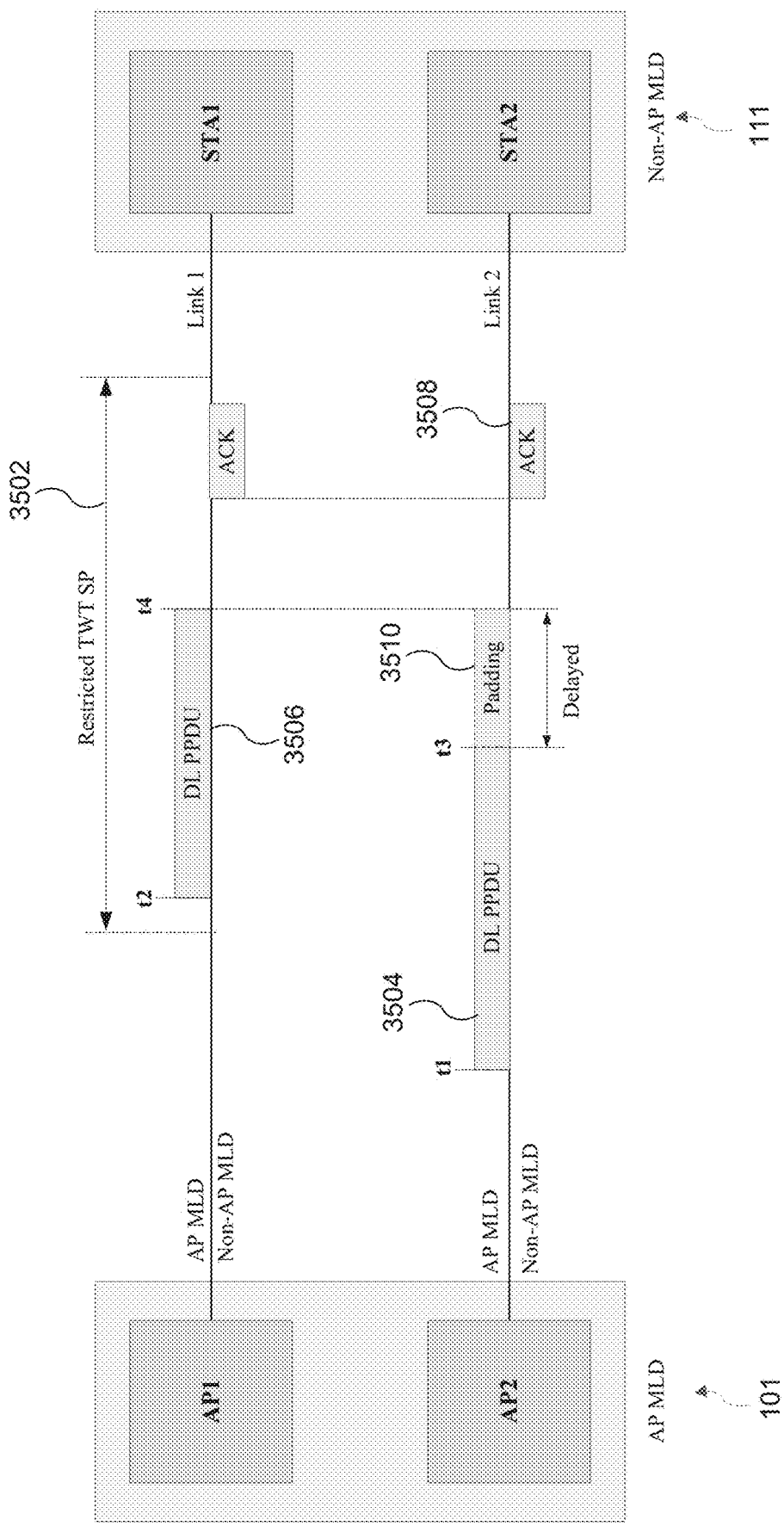
FIG. 35 illustrates an example of PPDU alignment through extension of PPDU end time on one link according to various embodiments of the present disclosure.

For the scenario in which a restricted TWT schedule, which is a trigger-enabled TWT, is established on a first link between an AP MLD and a non-AP MLD that forms an NSTR link pair with a second link between the AP MLD and the non-AP MLD, if the downlink PPDU transmission on the second link ends before an ongoing downlink PPDU transmission on the first link during the restricted TWT SP, the ACK for the downlink PPDU on the second link may cause interference with the ongoing downlink PPDU on the first link due to NSTR constraints. This may potentially disrupt the latency-sensitive traffic flow during the restricted TWT SP on the first link. In order to avoid such a situation, according to one embodiment, DL PPDU transmission on the second link is delayed, padded, extended, or elongated such that the end time of the DL PPDU on the second link is aligned with the end time of the DL PPDU on the first link during the restricted TWT SP. This would protect the latency-sensitive traffic flow transmitted on the first link during the restricted TWT SP. FIG. 35 illustrates this embodiment.

FIG. 35 illustrates an example of PPDU alignment through extension of PPDU end time on one link. Similar to FIGS. 30-32 and 34, AP1 and AP2 are two APs affiliated with the AP MLD 101, while STA1 and STA2 are two non-AP STAs affiliated with the non-AP MLD 111. Two links are set up between the AP MLD and the non-AP MLD—Link 1 (the first link) between AP1 and STA1, and Link 2 (the second link) between AP2 and STA2. The non-AP MLD is an NSTR non-AP MLD, i.e., Link 1 and Link 2 form an NSTR link pair. Both Link 1 and Link 2 are enabled links. A restricted TWT schedule, which is a trigger-enabled TWT schedule, is established on Link 1, with corresponding restricted TWT SP 3502.

A DL PPDU 3504 transmission starts on Link 2 at time instant t1, and is initially scheduled to end at time instant t3. The DL PPDU 3504 duration on Link 2 overlaps in time with restricted TWT SP 3502 on Link 1. During the trigger-enabled restricted TWT SP 3502 on Link 1, a DL PPDU 3506 starts at time instant t2 and is scheduled to end at time instant t4, where t4 occurs after t3. In order to avoid the subsequent ACK 3508 on Link 2 facing NSTR interference with the ongoing DL PPDU on Link 1, according to this embodiment, AP2 on Link 2 extends the DL PPDU 3504 on Link 2 (for example, by adding padding 3510) and aligns its end time with the end time of the DL PPDU 3506 on Link 1 during the restricted TWT SP 3502.

Figure 36:
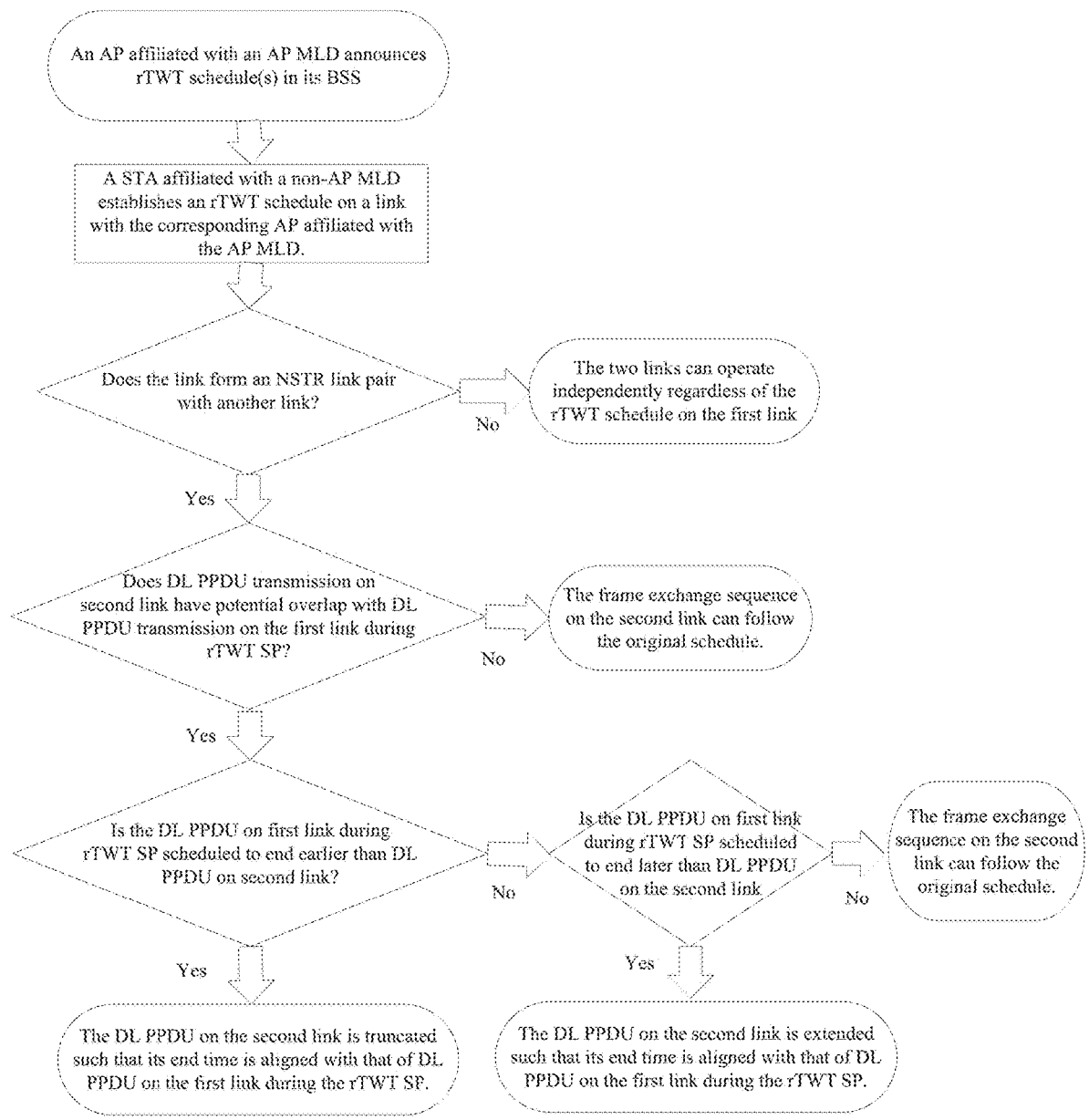
FIG. 36 illustrates an example process for extension or truncation of PPDU end time on one link in order to align PPDUs with another link to avoid NSTR interference according to various embodiments of the present disclosure.

FIG. 36 illustrates an example process for extension or truncation of PPDU end time on one link in order to align PPDUs with another link to avoid NSTR interference according to various embodiments of the present disclosure. The example process of FIG. 36 may include the procedures illustrated in, e.g., FIGS. 34 and 35.

Figure 37:
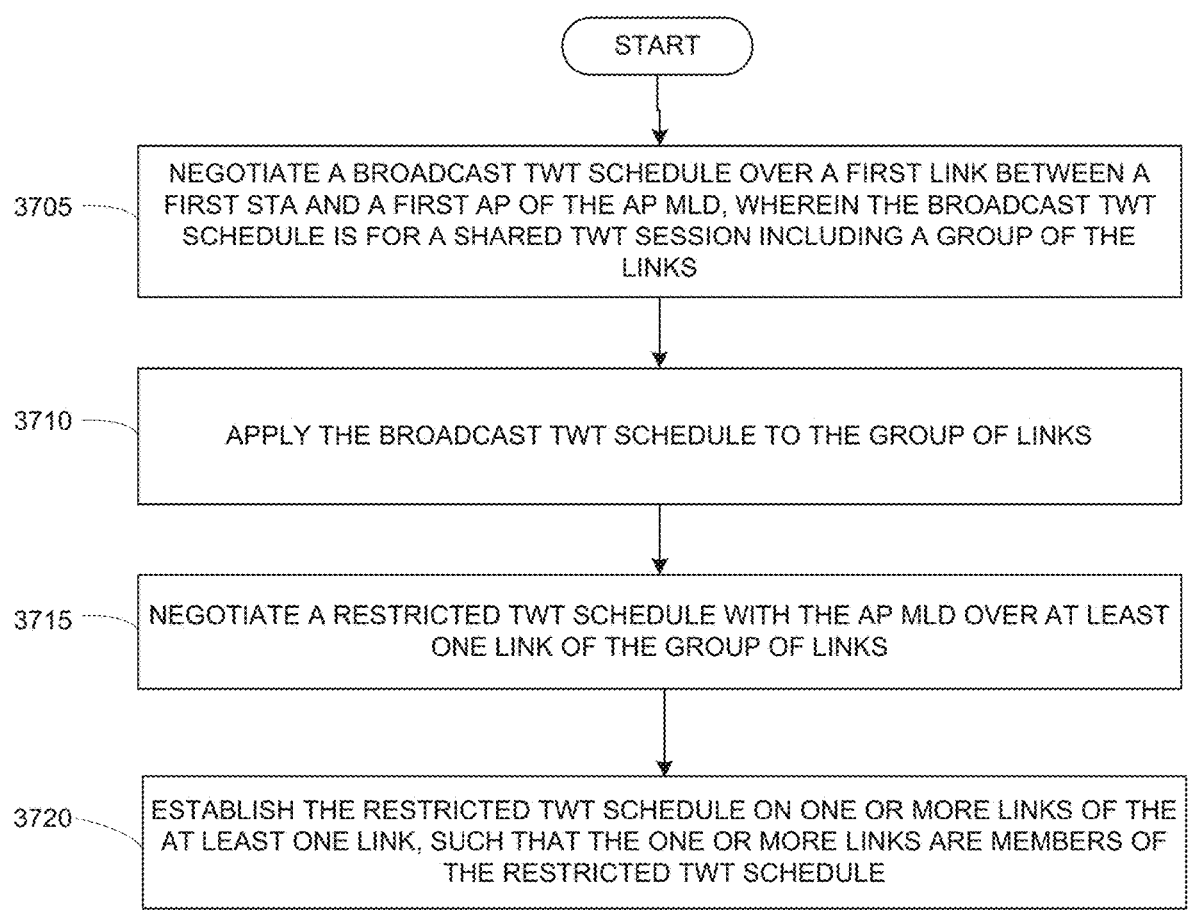
FIG. 37 illustrates an example process for facilitating restricted TWT operation between MLDs in a WLAN according to various embodiments of the present disclosure.

FIG. 37 illustrates an example process for facilitating restricted TWT operation between MLDs in a WLAN according to various embodiments of the present disclosure. The process of FIG. 37 is discussed as being performed by a non-AP MLD, but it is understood that a corresponding AP MLD performs a corresponding process. Additionally, for convenience, the process of FIG. 37 is discussed as being performed by a WI-FI non-AP MLD comprising a plurality of STAs that each comprise a transceiver configured to transmit and receive signals in TWT operation on MLO links between the STAs and corresponding APs of an AP MLD, respectively. However, it is understood that any suitable wireless communication device could perform these processes.

Referring to FIG. 37, the process begins with the non-AP MLD negotiating a broadcast TWT schedule over a first link between a first STA and a first AP of the AP MLD, wherein the broadcast TWT schedule is for a shared TWT session including a group of the links (step 3705).

After the broadcast TWT schedule is successfully negotiated, the non-AP MLD applies the broadcast TWT schedule to the group of links (step 3710).

Next, the non-AP MLD negotiates a restricted TWT schedule with the AP MLD over at least one link of the group of links (step 3715). In some embodiments, a broadcast TWT parameter set corresponding to the broadcast TWT schedule is exchanged during the negotiation at step 3705, wherein the broadcast TWT parameter set indicates that the broadcast TWT schedule is the restricted TWT schedule. In some such embodiments, a broadcast TWT recommendation subfield of a request type field of the broadcast TWT parameter set is set to a value in the range of 4 through 7 to indicate that the broadcast TWT schedule is the restricted TWT schedule. In other such embodiments, a request type field of the broadcast TWT parameter set or a broadcast TWT info field of the broadcast TWT parameter set include an indication that the restricted TWT schedule is also an aligned schedule.

In some embodiments, at step 3715 the negotiation of the restricted TWT schedule with the AP MLD is for establishment of the restricted TWT schedule on a desired link that is the same as or different from the at least one link over which the restricted TWT schedule is negotiated, and each TID for which the restricted TWT schedule is negotiated is mapped to the desired link through TID-to-link mapping.

After the restricted TWT schedule is successfully negotiated, the non-AP MLD then establishes the restricted TWT schedule on one or more links of the at least one link, such that the one or more links are members of the restricted TWT schedule (step 3720).

In some embodiments, first and second links of the group of links form an NSTR pair, wherein the first link has the restricted TWT schedule established on it at step 3720. In some such embodiments, transmission of frames on the second link may be terminated before a restricted TWT SP begins on the first link. In other such embodiments, transmission of frames on the second link is elongated or padded such that an end time of a downlink PPDU on the second link is aligned with an end time of a downlink PPDU on the first link. In yet other such embodiments, based on transmission of a downlink PPDU on the first link ending, transmission of a DL PPDU on the second link is truncated such that the end time of the DL PPDU on the second link is aligned with an end time of the DL PPDU on the first link.

The above flowchart illustrates an example method that can be implemented in accordance with the principles of the present disclosure and various changes could be made to the method illustrated in the flowchart. For example, while shown as a series of steps, various steps could overlap, occur in parallel, occur in a different order, or occur multiple times. In another example, steps may be omitted or replaced by other steps.

Figure 38:
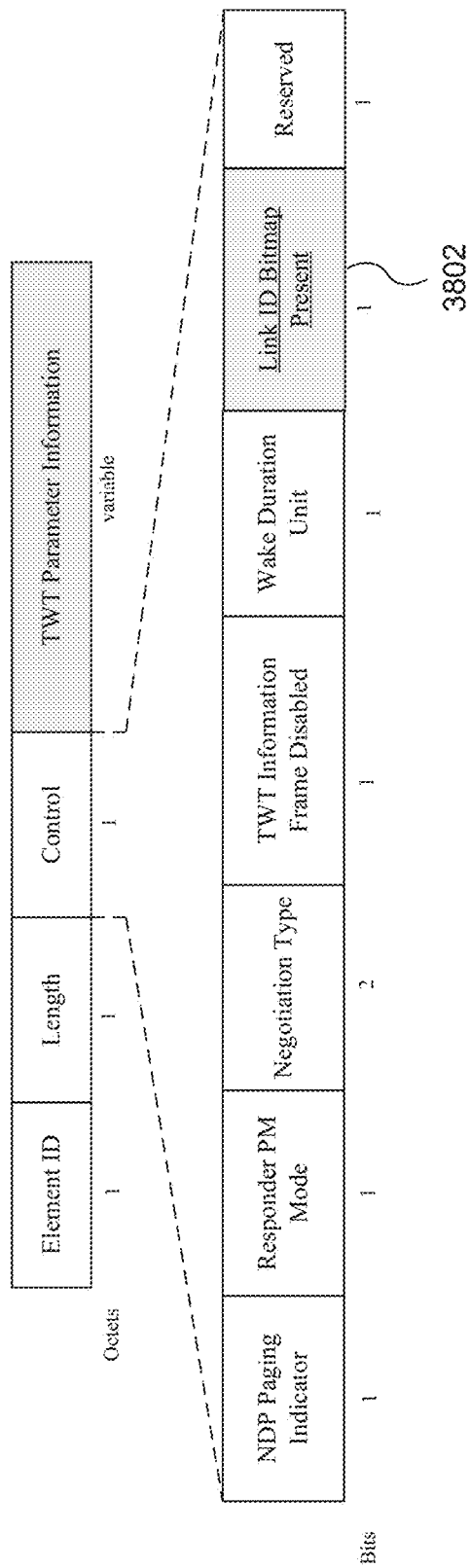
FIG. 38 illustrates an example of a Control field of a TWT element according to various embodiments of the present disclosure.

In order to indicate multiple links for individual TWT operation, in 802.11be draft, a Link ID Bitmap subfield was introduced in the Individual TWT Parameter Set field. The corresponding bitmap presence indicator is placed in the Control field of the TWT element. FIG. 38 illustrates an example of such a Control field of a TWT element, including the bitmap presence indicator 3802.

Figure 39:
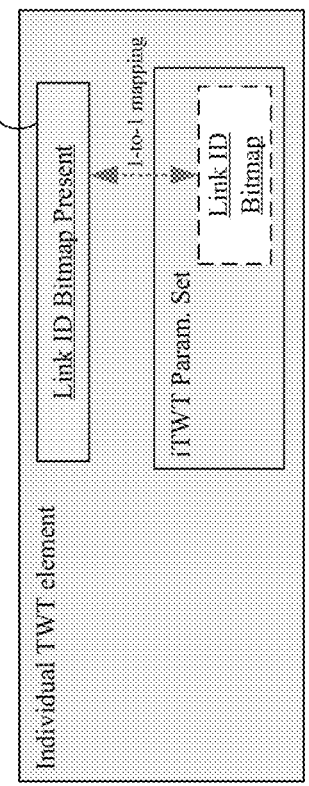
FIG. 39 illustrates an example Individual TWT element including a one-to-one mapping between a Link ID Bitmap in an individual TWT parameter set and a related presence indicator according to various embodiments of the present disclosure.

An Individual TWT element contains a single parameter set corresponding to a single TWT agreement (presence of a second parameter set is possible to indicate TWT parameter ranges corresponding to a single TWT agreement). So placing the Link ID Bitmap Present subfield in the Control field of the TWT element works out for individual TWT since there is a one-to-one mapping between the Link ID Bitmap in the parameter set and the related presence indicator. FIG. 39 illustrates an example Individual TWT element including such a one-to-one mapping between the Link ID Bitmap in the individual TWT parameter set and the related presence indicator 3902.

Figure 40:
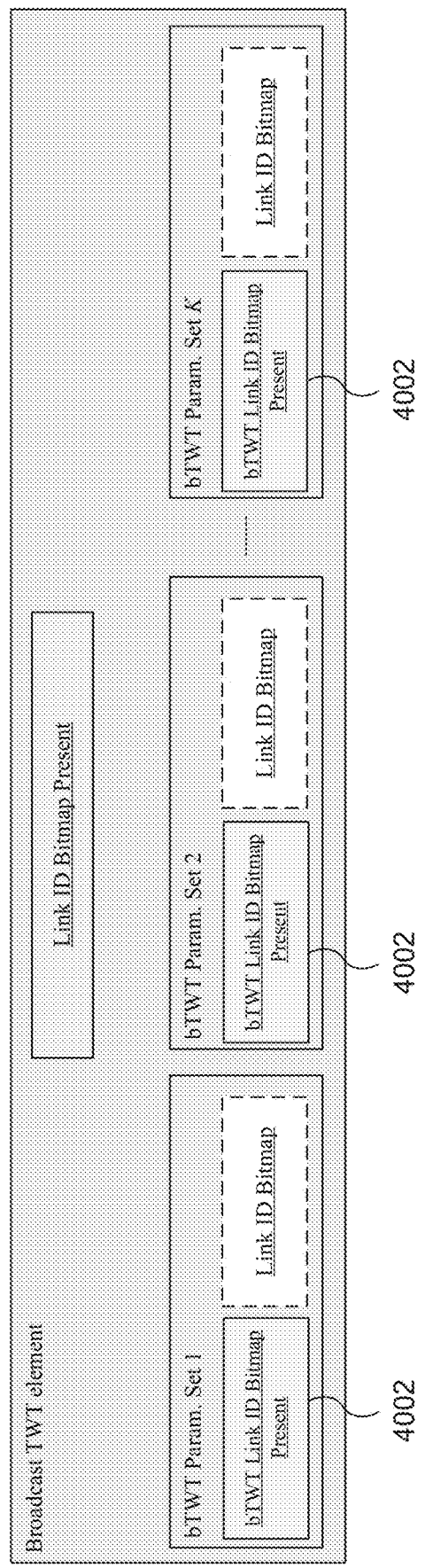
FIG. 40 illustrates an example broadcast TWT element including multiple parameter sets according to various embodiments of the present disclosure.

In a broadcast TWT element, however, there can be multiple parameter sets corresponding to different broadcast TWT schedules. In the MLO context, each parameter set may be negotiated for a different set of links. Hence, to indicate the presence of the Link ID Bitmap in a broadcast TWT parameter set, the presence indicator needs to be within the corresponding parameter set. FIG. 40 illustrates an example broadcast TWT element including multiple parameter sets. As illustrated in FIG. 40, a presence indicator 4002 is included within each corresponding broadcast TWT parameter set.

FIG. 41 illustrates an example format of the Broadcast TWT Parameter Set field in the TWT element according to one embodiment. The Link ID Bitmap subfield 4102 indicates the links to which an individual or broadcast TWT parameter set contained in the TWT element sent by a STA affiliated with an MLD applies. A value of 1 in bit position i of the Link ID Bitmap subfield 4102 means that the link associated with the link ID i is the link to which the TWT parameter set in the TWT element sent by a STA affiliated with an MLD applies. A value of 0 in bit position i of the Link ID Bitmap subfield means that the link associated with the link ID i is not the link to which the TWT parameter set in the TWT element sent by a STA affiliated with an MLD applies.

FIG. 42 illustrates an example format of the Request Type field in the Broadcast TWT Parameter Set field according to one embodiment. The Broadcast TWT Link ID Bitmap Present subfield 4202 indicates whether or not a Link ID Bitmap subfield 4102 is present in the corresponding Broadcast TWT Parameter Set field. The Broadcast TWT Link ID Bitmap Present subfield 4202 is set to 1 if the Link ID Bitmap subfield 4102 is present in the corresponding Broadcast TWT Parameter Set field. Otherwise, it is set to 0. In some embodiments, this subfield is set to 0 when the corresponding Broadcast TWT Parameter Set field is carried in a TWT element with Negotiation Type subfield set to 2.

According to one embodiment, a TWT scheduling AP affiliated with an AP MLD and a TWT scheduled STA affiliated with a non-AP MLD, for negotiating membership of a broadcast TWT schedule, shall follow the rules existing rules defined in the spec with the following additional rules.

According to one embodiment, the TWT scheduled STA affiliated with the non-AP MLD or the TWT scheduling AP affiliated with the AP MLD, while negotiating for a broadcast TWT schedule, may indicate the link or links between the AP MLD and the non-AP MLD for which the negotiation is being conducted. The TWT scheduled STA or the TWT scheduling AP transmitting the TWT element may make the link indication in the Link ID Bitmap subfield in the Broadcast TWT Parameter Set field corresponding to the broadcast TWT schedule.

According to one embodiment, if one or more links are indicated in the Link ID Bitmap subfield in the Broadcast TWT Parameter Set field transmitted by the TWT scheduled STA affiliated with the non-AP MLD or the TWT scheduling AP affiliated with the AP MLD, then the corresponding broadcast TWT schedule is negotiated on behalf of the STAs affiliated with the same MLD and operating on the indicated links between the AP MLD and the non-AP MLD. The Target Wake Time field in the Broadcast TWT Parameter Set field shall be in reference to the TSF time of the respective links that are indicated in the Link ID Bitmap.

According to one embodiment, a TWT scheduling AP affiliated with an AP MLD that receives a TWT element with Link ID Bitmap subfield in a Broadcast TWT Parameter Set field from a TWT scheduled STA affiliated with a non-AP MLD may respond by including a Link ID Bitmap subfield in the TWT response that indicates a different set of links as that of the received Link ID Bitmap or the same set of links as that of the received Link ID Bitmap but with different TWT parameters if the TWT Setup Command field in the Request Type field in the corresponding Broadcast TWT Parameter Set field in the response frame is set to Alternate TWT or Dictate TWT. The TWT scheduling AP shall respond with a Link ID Bitmap that indicates the same set of links in the received Link ID Bitmap and the same TWT parameters as that indicated in the received Broadcast TWT Parameter Set field if the TWT Setup Command field in the Request Type field in the corresponding Broadcast TWT Parameter Set field in the response frame is set to Accept TWT or Reject TWT.

According to one embodiment, if a TWT scheduling AP affiliated with an AP MLD or a TWT scheduled STA affiliated with a non-AP MLD transmits a broadcast TWT element that contains a Link ID Bitmap subfield in at least one of the Broadcast TWT Parameter Set fields included in the TWT element, then the TWT scheduling AP or the TWT scheduled STA shall set the Link ID Bitmap Present subfield in the Control field of the broadcast TWT element to 1. Otherwise, the TWT scheduling AP or the TWT scheduled STA shall set the Link ID Bitmap Present subfield to 0.

According to one embodiment, the AP MLD or the non-AP MLD shall not transmit a TWT element over any of the links set up between them that includes a TWT parameter set field containing a Link ID Bitmap subfield with $k^{th}$ bit in the bitmap set to 1 if the corresponding $k^{th}$ link is disabled for the non-AP MLD through TID-to-Link mapping.

For restricted TWT operation between an AP MLD and a non-AP MLD, the AP MLD or the non-AP MLD shall not transmit a TWT element over any of the set up links between them that includes an restricted TWT parameter set with the $k^{th}$ bit in the Restricted TWT DL TID Bitmap subfield or Restricted TWT UL TID Bitmap subfield, if present, set to 1 if the TID k for the respective direction is not mapped, through TID-to-Link mapping, on the intended link for which the restricted TWT schedule is being negotiated. Moreover, the AP MLD or the non-AP MLD shall not transmit a TWT element over any of the links between them that includes a restricted TWT parameter set with the DL TID Bitmap Valid subfield or UL TID Bitmap Valid subfield, if present, to 0 if any of the TIDs is not mapped on the desired link for the respective direction.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD) comprising:
   a plurality of stations (STAs) that each comprise a transceiver configured to transmit and receive signals in target wake time (TWT) operation on multi-link operation (MLO) links between the STAs and corresponding APs of an AP MLD, respectively; and
   a processor operably coupled to the transceivers, the processor configured to:
   negotiate a broadcast TWT schedule over a first link between a first STA and a first AP of the AP MLD, wherein the broadcast TWT schedule is for a shared TWT session including a group of the links;
   after the broadcast TWT schedule is successfully negotiated, apply the broadcast TWT schedule to the group of links;
   negotiate a restricted TWT schedule with the AP MLD over at least one link of the group of links; and
   after the restricted TWT schedule is successfully negotiated, establish the restricted TWT schedule on one or more links of the at least one link, such that the one or more links are members of the restricted TWT schedule.

2. The non-AP MLD of claim 1, wherein:
the transceivers are further configured to transmit to or receive from the AP MLD on the at least one link of the group of links, via a corresponding at least one STA of the STAs, a broadcast TWT parameter set corresponding to the broadcast TWT schedule, and
the broadcast TWT parameter set indicates that the broadcast TWT schedule is the restricted TWT schedule.

3. The non-AP MLD of claim 2, wherein a broadcast TWT recommendation subfield of a request type field of the broadcast TWT parameter set is set to a value in a range of 4 through 7 to indicate that the broadcast TWT schedule is the restricted TWT schedule.

4. The non-AP MLD of claim 2, wherein a request type field of the broadcast TWT parameter set or a broadcast TWT info field of the broadcast TWT parameter set include an indication that the restricted TWT schedule is also an aligned schedule.

5. The non-AP MLD of claim 1, wherein:
the processor is further configured to negotiate the restricted TWT schedule with the AP MLD for a desired link that is the same as or different from the at least one link over which the restricted TWT schedule is negotiated, and
each traffic identifier (TID) for which the restricted TWT schedule is negotiated is mapped to the desired link through TID-to-link mapping.

6. The non-AP MLD of claim 1, wherein:
first and second links of the group of links form a non-simultaneous transmit/receive (NSTR) pair,
the first link has the restricted TWT schedule established, and
transmission of frames on the second link is terminated before a restricted TWT service period (SP) begins on the first link.

7. The non-AP MLD of claim 1, wherein:
first and second links of the group of links form a non-simultaneous transmit/receive (NSTR) pair,
the first link has the restricted TWT schedule established, and
based on transmission of a downlink (DL) physical layer protocol data unit (PPDU) on the first link ending, transmission of a DL PPDU on the second link is truncated such that an end time of the DL PPDU on the second link is aligned with an end time of the DL PPDU on the first link, or
transmission of frames on the second link is elongated or padded, such that the end time of the DL PPDU on the second link is aligned with the end time of the DL PPDU on the first link.

8. An access point (AP) multi-link device (MLD) comprising:
a plurality of APs that each comprise a transceiver configured to transmit and receive signals in target wake time (TWT) operation on multi-link operation (MLO) links between the APs and corresponding stations (STAs) of a non-AP MLD, respectively; and
a processor operably coupled to the transceivers, the processor configured to:
negotiate a broadcast TWT schedule over a first link between a first AP and a first STA of the non-AP MLD, wherein the broadcast TWT schedule is for a shared TWT session including a group of the links;
after the broadcast TWT schedule is successfully negotiated, apply the broadcast TWT schedule to the group of links;
negotiate a restricted TWT schedule with the non-AP MLD over at least one link of the group of links; and
after the restricted TWT schedule is successfully negotiated, establish the restricted TWT schedule on one or more links of the at least one link, such that the one or more links are members of the restricted TWT schedule.

9. The AP MLD of claim 8, wherein:
the transceivers are further configured to transmit to or receive from the non-AP MLD on the at least one link of the group of links, via a corresponding at least one AP of the APs, a broadcast TWT parameter set corresponding to the broadcast TWT schedule, and
the broadcast TWT parameter set indicates that the broadcast TWT schedule is the restricted TWT schedule.

10. The AP MLD of claim 9, wherein a broadcast TWT recommendation subfield of a request type field of the broadcast TWT parameter set is set to a value in a range of 4 through 7 to indicate that the broadcast TWT schedule is the restricted TWT schedule.

11. The AP MLD of claim 9, wherein a request type field of the broadcast TWT parameter set or a broadcast TWT info field of the broadcast TWT parameter set include an indication that the restricted TWT schedule is also an aligned schedule.

12. The AP MLD of claim 8, wherein:
the processor is further configured to negotiate the restricted TWT schedule with the non-AP MLD for a desired link that is the same as or different from the at least one link over which the restricted TWT schedule is negotiated, and
each traffic identifier (TID) for which the restricted TWT schedule is negotiated is mapped to the desired link through TID-to-link mapping.

13. The AP MLD of claim 8, wherein:
first and second links of the group of links form a non-simultaneous transmit/receive (NSTR) pair,
the first link has the restricted TWT schedule established, and
transmission of frames on the second link is terminated before a restricted TWT service period (SP) begins on the first link.

14. The AP MLD of claim 8, wherein:
first and second links of the group of links form a non-simultaneous transmit/receive (NSTR) pair,
the first link has the restricted TWT schedule established, and
based on transmission of a DL PPDU on the first link ending, transmission of a DL PPDU on the second link is truncated such that an end time of the DL PPDU on the second link is aligned with an end time of the DL PPDU on the first link, or
transmission of frames on the second link is elongated or padded, such that the end time of the DL PPDU on the second link is aligned with the end time of the DL PPDU on the first link.

15. A method for facilitating broadcast target wake time (TWT) operation by a non-access point (AP) multi-link device (MLD), the method comprising:
negotiating a broadcast TWT schedule over a first link between a first STA and a first AP of the AP MLD, wherein the broadcast TWT schedule is for a shared TWT session including a group of the links;

after the broadcast TWT schedule is successfully negotiated, applying the broadcast TWT schedule to the group of links;

negotiating a restricted TWT schedule with the AP MLD over at least one link of the group of links; and after the restricted TWT schedule is successfully negotiated, establishing the restricted TWT schedule on one or more links of the at least one link, such that the one or more links are members of the restricted TWT schedule.

16. The method of claim 15, further comprising receiving a broadcast TWT parameter set corresponding to the broadcast TWT schedule, wherein the broadcast TWT parameter set indicates that the broadcast TWT schedule is the restricted TWT schedule.

17. The method of claim 16, wherein a broadcast TWT recommendation subfield of a request type field of the broadcast TWT parameter set is set to a value in a range of 4 through 7 to indicate that the broadcast TWT schedule is the restricted TWT schedule.

18. The method of claim 16, wherein a request type field of the broadcast TWT parameter set or a broadcast TWT info field of the broadcast TWT parameter set include an indication that the restricted TWT schedule is also an aligned schedule.

19. The method of claim 15, further comprising:

negotiating the restricted TWT schedule with the AP MLD for a desired link that is the same as or different from the at least one link over which the restricted TWT schedule is negotiated, wherein each traffic identifier (TID) for which the restricted TWT schedule is negotiated is mapped to the desired link through TID-to-link mapping.

20. The method of claim 15, wherein:

first and second links of the group of links form a non-simultaneous transmit/receive (NSTR) pair, the first link has the restricted TWT schedule established, and transmission of frames on the second link is terminated before a restricted TWT service period (SP) begins on the first link.

* * * * *